United States Patent
Li et al.

(10) Patent No.: US 10,785,101 B2
(45) Date of Patent: Sep. 22, 2020

(54) AUTOMATICALLY OPTIMIZE PARAMETERS VIA MACHINE LEARNING

(71) Applicant: Futurewei Technologies, Inc., Plano, TX (US)

(72) Inventors: Ying Li, Hillsborough, NJ (US); Jin Yang, Bridgewater, NJ (US); Xin Li, Xian (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 107 days.

(21) Appl. No.: 15/684,760

(22) Filed: Aug. 23, 2017

(65) Prior Publication Data

US 2019/0068443 A1    Feb. 28, 2019

(51) Int. Cl.
*H04L 12/24* (2006.01)
*H04L 12/26* (2006.01)
(Continued)

(52) U.S. Cl.
CPC ......... *H04L 41/0816* (2013.01); *G06N 20/00* (2019.01); *H04L 41/0823* (2013.01);
(Continued)

(58) Field of Classification Search
CPC ........... H04L 41/0816; H04L 41/0823; H04W 24/02; G06N 20/00
See application file for complete search history.

(56) References Cited

U.S. PATENT DOCUMENTS 9,219,555 B2    12/2015  Ouyang et al.
2013/0310048 A1*  11/2013  Hunukumbure .. H04W 52/0206
                                                455/443
(Continued)

FOREIGN PATENT DOCUMENTS

CN   105634787 A    6/2016
CN   107046480 A    8/2017

OTHER PUBLICATIONS

International Search Report dated Oct. 19, 2018 in PCT Application No. PCT/CN2018/097789, 9 pages.

*Primary Examiner* — Andrew Lai
*Assistant Examiner* — Harry H Kim
(74) *Attorney, Agent, or Firm* — Vierra Magen Marcus LLP

(57) ABSTRACT

The disclosure relates to technology for configuring parameters in a wireless communications network. Parameter configurations resulting in a change to key quality indicator (KQI) and key performance indicator (KPI) measurements are determined based on collected data samples. The data samples are divided into subsets including a first subset including the data samples associated with the parameter configurations failing to result in the change to the KQI and KPI measurements, and a second subset including the data samples associated with the parameter configurations resulting in the change to the KQI and KPI measurements dependent upon satisfying conditions in the wireless communications network. The subsets of the data samples are then determined for using machine learning to optimize the parameter configurations, and subsets of the data samples are provided as an input to machine learning for the parameter configurations to optimize the wireless communications network.

24 Claims, 18 Drawing Sheets

(51) Int. Cl.
*G06N 20/00* (2019.01)
*H04W 24/02* (2009.01)
*H04W 24/08* (2009.01)

(52) U.S. Cl.
CPC ........... *H04L 43/022* (2013.01); *H04W 24/02* (2013.01); *H04L 41/145* (2013.01); *H04L 41/147* (2013.01); *H04L 41/16* (2013.01); *H04L 43/08* (2013.01); *H04L 43/16* (2013.01); *H04W 24/08* (2013.01)

(56) References Cited

U.S. PATENT DOCUMENTS

| | | | |
|---|---|---|---|
| 2016/0006529 A1* | 1/2016 | Yi | H04J 11/005 370/329 |
| 2016/0165462 A1* | 6/2016 | Tan | H04W 24/02 370/254 |
| 2016/0165468 A1 | 6/2016 | Gopalakrishnan et al. | |
| 2016/0205697 A1* | 7/2016 | Tan | H04W 24/02 370/329 |

* cited by examiner

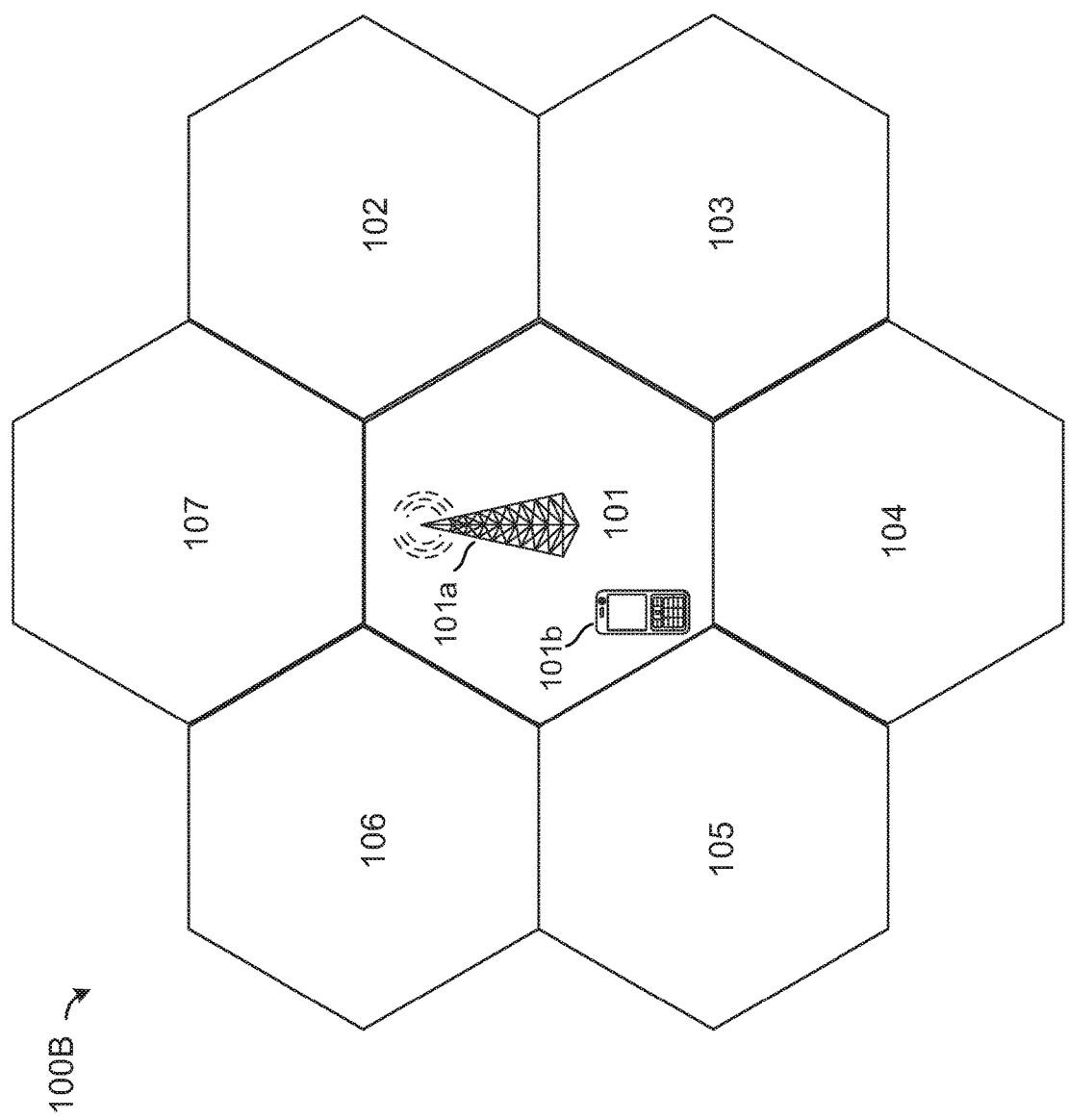

| Gain after using optimized parameters | UE average throughput | UE average throughput at busy hours | Load balancing level |
|---|---|---|---|
| | Gain > 8% | Gain > 9% | Gain > 8% |

*FIG. 12A*

| Gain after applying the optimized parameters | UE average throughput | UE average throughput at busy hours |
|---|---|---|
| | 8.88% | 9.07% |

*FIG. 12B*

| Gain after applying the optimized parameters | UE average throughput | Cell average throughput |
|---|---|---|
| | 5.7% | 6.7% |

*FIG. 12C*

AUTOMATICALLY OPTIMIZE PARAMETERS VIA MACHINE LEARNING

BACKGROUND

In wireless networks, such as Radio Access Networks (RANs), including Long Term Evolution (LTE), LTE-Advanced (LTE-A) radio access networks, one challenge is to configure operating parameters such that the network is operating at maximum efficiency. Accordingly, network optimization is a major feature of many modern cellular networks.

In order to guarantee the best possible performance to the cellular network subscribers, the network is periodically optimized so that its resources can be more effectively utilized within a core network and/or the RAN. Typically, network optimization is affected by manually modifying network parameters in the radio and core networks based on information that relates to network performance. Such information is retrieved periodically and analyzed by an Operations and Support System (OSS) to derive key quality indicators (KQIs) and key performance indicators (KPIs). However, there are numerous (sometimes thousands) parameters for a RAN, making it extremely difficult to rely on manual modification to optimize these parameters. Moreover, many of the parameters may not be immediately reflected in the KQIs and/or KPIs that are indicative of the overall network performance, thereby making optimization even more difficult.

BRIEF SUMMARY

According to one aspect of the present disclosure, there is provided a computer-implemented method for configuring parameters in a wireless communications network, the method comprising determining whether parameter configurations result in a change to at least one of key quality indicator (KQI) or key performance indicator (KPI) measurements based on data samples collected in the wireless communications network; dividing the data samples into subsets including a first subset of the data samples including the data samples associated with the parameter configurations failing to result in the change to the at least one of the KQI and KPI measurements, or a second subset of the data samples including the data samples associated with the parameter configurations resulting in the change to at least one of the KQI or KPI measurements dependent upon a triggering threshold being satisfied and an operation corresponding to the triggering threshold being successfully executed in the wireless communications network; determining which of the subsets of the data samples to use machine learning for optimizing the parameter configurations; and providing the determined subsets of the data samples as an input to machine learning for the parameter configurations to optimize the wireless communications network.

Optionally, in any of the preceding aspects, the method further includes a determination of whether the parameter configurations result in a change to at least one of the KQI or KPI measurements is based on satisfying one or more conditions in the wireless communications network.

Optionally, in any of the preceding aspects, the method further includes the one or more conditions include at least of a triggering threshold, an operation being triggered and the operation being successfully executed.

Optionally, in any of the preceding aspects, the method further includes separating the parameter configurations into categories including a first category corresponding to the data samples for which the parameter configurations always result in the change to at least one of the KQI or KPI measurements, and a second category corresponding to the first and second subsets of the data samples; and providing the first category of parameter configurations as an input to machine learn the parameter configurations to optimize the wireless communications network.

Optionally, in any of the preceding aspects, the method further includes the parameter configurations include at least one of a single parameter, a composite parameter including multiple parameters, a function of one or multiple parameters, or an expression of one or multiple parameters.

Optionally, in any of the preceding aspects, the method further includes the first and second subsets of data samples learn from each other.

Optionally, in any of the preceding aspects, the method further includes the machine learning comprises: selecting features for clustering one or more cells in the wireless communications network; identifying the features that are independent of the parameter configurations to be optimized; clustering the one or more cells for a time period using the identified features; and selecting, within a cluster of the one or more cells, values for the parameter configurations to optimize the wireless communications network performance.

Optionally, in any of the preceding aspects, the method further includes selecting the values comprises: comparing the wireless communications network performance for each of the values of parameter configurations, and choosing the value associated with the parameter configuration that results in the optimized wireless communications network performance; and further comprising: reconfiguring the one or more cells in the cluster in which the wireless communication network results in less than optimal network performance using the chosen value.

Optionally, in any of the preceding aspects, the method further includes the identifying the features as independent of the parameter configurations to be optimized is determined by at least one of the effect of changing the parameter configurations one the feature, a degree of impact of the feature changing when the parameter configurations are tuned, or a correlation of the parameter configurations and the feature.

According to one aspect of the present disclosure, there is provided a device for configuring parameters in a wireless communications network comprising a non-transitory memory storage comprising instructions; and one or more processors in communication with the memory, wherein the one or more processors execute the instructions to perform operations comprising: determining whether parameter configurations result in a change to at least one of key quality indicator (KQI) or key performance indicator (KPI) measurements based on data samples collected in the wireless communications network; dividing the data samples into subsets including a first subset of the data samples including the data samples associated with the parameter configurations failing to result in the change to the at least one of the KQI or KPI measurements, and a second subset of the data samples including the data samples associated with the parameter configurations resulting in the change to at least one of the KQI or KPI measurements dependent upon a triggering threshold being satisfied and an operation corresponding to the triggering threshold being successfully executed in the wireless communications network; determining which of the subsets of the data samples to use machine learning for optimizing the parameter configurations; and providing the determined subsets of the data samples as an input to machine learning for the parameter configurations to optimize the wireless communications network.

According to one aspect of the present disclosure, there is provided a non-transitory computer-readable medium storing computer instructions for configuring parameters in a wireless communications network, that when executed by one or more processors, perform the steps of determining whether parameter configurations result in a change to at least one of key quality indicator (KQI) or key performance indicator (KPI) measurements based on data samples collected in the wireless communications network; dividing the data samples into subsets including a first subset of the data samples including the data samples associated with the parameter configurations failing to result in the change to the at least one of the KQI or KPI measurements, and a second subset of the data samples including the data samples associated with the parameter configurations resulting in the change to at least one of the KQI or KPI measurements dependent upon a triggering threshold being satisfied and an operation corresponding to the triggering threshold being successfully executed in the wireless communications network; determining which of the subsets of the data samples to use machine learning for optimizing the parameter configurations; and providing the determined subsets of the data samples as an input to machining for the parameter configurations to optimize the wireless communications network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIG. 1B illustrates a wireless communication network.

FIG. 12A is a table illustrating gains obtained by application of the optimized parameter configurations to cells in a network.

FIGS. 12B and 12C are tables illustrating gains obtained by application of the optimized parameter configurations to cells in a network when using intelligent clustering.

DETAILED DESCRIPTION

Figure 1A:
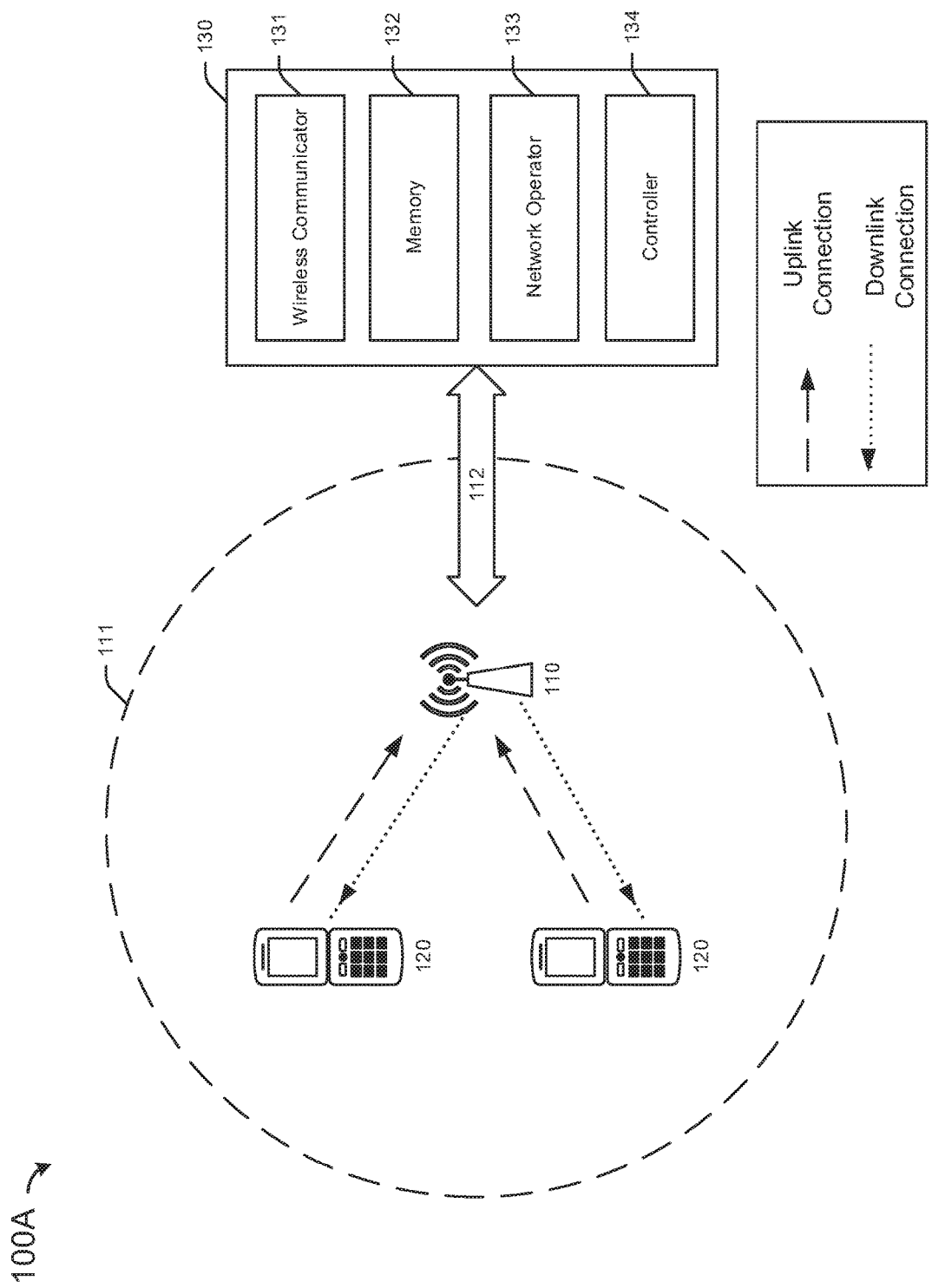
FIG. 1A is a diagram of an exemplary cellular network for communicating data in which the present technology may be implemented.

The disclosure relates to technology for automatically configuring parameters in a wireless communication network, such as a cellular network.

In traditional models, engineers analyze the network to determine performance based on the configured parameters. Engineers may select different parameter values for configuration and monitor the network for performance for each of the different parameter values. The performance results may then be compared in each instance to determine which of the different parameter values results in the optimal network performance. As numerous parameters need to be measured (e.g., sometimes thousands of parameters), the analysis process can be extremely laborious, time consuming and expensive. Moreover, as network conditions are constantly changing, it is difficult to properly identify parameters to maximize network performance.

In one embodiment, the disclosed technology configures parameters using machine learning to determine by selecting a subset of data samples collected from the network. The subset may be used as input to the machine learning in order to determine the value for configuring the parameters in which to optimize network performance. In particular, data samples collected from the network are divided into different categories—one which relates to the configured parameters affecting or impacting the network performance (e.g., the configured parameters are reflected in the network performance) and another in which the configured parameters do not always, but may, affect the network performance (e.g., the configured parameters affect or impact the network performance dependent upon satisfying one or more conditions). In the latter case, parameters that do not affect the network performance may be discarded (in most cases) and parameters affecting network performance (and satisfy one or more conditions) for a subset of the data samples to be applied as input to machine learning for configuration parameters in which to optimize network performance.

In another embodiment, a "smart" or intelligent clustering method is implemented in which to machine learn optimal parameters using features that are independent of (or nearly independent of) the parameters to be optimized.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1A is a diagram of an exemplary cellular network for communicating data in which the present technology may be implemented. In one embodiment, the cellular network 100A includes a base station 110 having a wireless coverage area 111, a plurality of mobile devices 120, and a server 130.

A base station 110, also referred to herein as BS 110, is any component (or collection of components) configured to provide wireless access in a wireless network. In the context of wireless networks more generally, the BS 110 may also be referred to as an access point (AP), which includes any component (or collection of components) configured to provide wireless access in a wireless network, such as an evolved NodeB (eNB), a macro-cell, a femtocell, or a Wi-Fi access point. In one embodiment, a BS 110 may include a set of electronic communications equipment that facilitate wireless communication between mobile devices 120 and a cellular network 100. The electronic communications equipment placed at BS 110 may include antennae, one or more transceivers, digital signal processors, control electronics, a GPS receiver, primary and backup electrical power sources, sheltering, and other equipment for sending and receiving information to and from mobile devices. A BS 110 may further have engineering parameters, including, but not limited to, a height of the radio tower, a mechanical tilt of its antennae, and an electronic tilt. Some of these parameters may be fixed while others are adjustable either mechanically or electronically.

A mobile device 120 is any component (or collection of components) capable of establishing a wireless connection with a BS 110. A mobile device may also be referred to as a user equipment (UE), a mobile station (STA), a relay, or a device engaging in machine type communication, as used in the art. Each mobile device 120 may produce mobile reports (MRs) regarding network performance, including measures such as reference signal received power (RSRP) and reference signal received quality (RSRQ).

A BS 110 may provide wireless communication coverage to mobile devices 120 such that each BS 110 may be communicatively linked to zero or more mobile devices 120 up to a certain capacity. As shown, the BS 110 establishes uplink (dashed line) and/or downlink (dotted line) connections with the mobile devices 120, which serve to carry data from the mobile devices 120 to the BS 110 and vice-versa. Data carried over the uplink/downlink connections may include data communicated between the mobile devices 120, as well as data communicated to/from the server 130. BS 110 may provide wireless access in accordance with one or more wireless communication protocols, e.g., long term evolution (LTE), LTE advanced (LTE-A), High Speed Packet Access (HSPA), and Wi-Fi 802.11a/b/g/n/ac.

In alternative embodiments, such as what is depicted in FIG. 1B, the cellular network 100 may include a plurality of BSs 110 communicatively connected to each other to form a network of BSs 110. Each BS may have its own coverage area 111. By connecting mobile devices 120 from different coverage areas 111 to a network of BSs 110, the mobile devices 120 are in effect also communicatively linked to each other and can transmit to and receive information from each other through the network of BSs 110.

The server 130 includes, for example, a wireless communicator 131, memory 132, network operation 133 and controller 134. The wireless communicator 131 transmits outbound information away from the server 130 and receives inbound information coming into the server 130, as depicted by arrow 112. This includes information sent to and from the BS 110 or a network of BSs 110 in alternative embodiments. In one embodiment, the server 130 is communicatively linked with the BS 110 via a direct communicative link. In alternative embodiments involving a network of BSs 110, the server may be directly linked to one of the BSs 110 that is geographically nearest to the server's 130 location. In another embodiment, each BS 110 in a network of BSs may have a direct communicative link to the server 130. It is understood that other configurations of network connections are possible in alternative embodiments of the present technology.

The memory 132 stores information at the server 130, including information received from the BS 110 and information about the BS 110. This may include mobile reports (MRs) from mobile devices 120, such as reference signal received power (RSRP), reference signal received quality (RSRQ), channel quality indicator (CQI), signal to interference plus signal to noise ratio. The memory 132 may also store information about the engineering parameters of BS 110, such as electronic tilt (eTilt), azimuth, and mechanical tilt (mTilt). The memory 132 may also store instructions, functions and software applications that the server 130 may call on and execute. The network operator 133 manages the operation of the BS 110 (or a network of BSs in an alternative embodiment), and receives and processes information from the wireless communicator 131 and memory 132 to generate control signals for configuring the BS 110 or to communicate with other elements in the cellular network 100.

The controller 134 may be any component, or collection of components, adapted to perform network optimization for the wireless coverage area 111. The controller 134 may be co-located with the BS 110. Alternatively, the controller 134 may be a device that is separate and distinct from the BS 110, in which case the controller 134 may communicate with the BS 110 via the server 130. Alternatively, the controller 134 may be implemented as a component of the server 130 and therefore communicate with the BS 110 via the server's 130 communications capabilities. In another embodiment, the controller may also be a component of a second server that is communicatively linked with the server 130 and communicates with the BS via the server 130.

FIG. 1B illustrates a wireless communication network. In one embodiment, the wireless communication network is a cellular network 100B having a plurality of cells 101-107, such as a long term evolution (LTE), or LTE-advanced (LTE-A), 3rd, 4th or 5th generation systems (3G, 4G, 5G) or future generation systems.

In an embodiment, each cell in a cellular network 100B includes a BS 110a to transmit and receive radio frequency (RF) signals to and from a user equipment (UE) 101b. In an embodiment, a BS 101a includes at least one antenna to transmit and receive RF signals as well as electronics, such as a computing device, to transfer information to and from a BS 101a. In embodiments, a large number of UEs are transmitting and receiving RF signals from respective BSs in respective cells in a cellular network 100B. In embodiments, base stations are coupled to a switching computing device and/or central computing device via wired and/or wireless electronic connections. In order to clearly describe the technology, a single BS101a and UE 101b is illustrated in cell 101 of FIG. 1B, although it is appreciated that any number of BSs and UEs may be employed.

In an embodiment, UE 101*b* is a computing device embodied as a cellular telephone. In other embodiments, UE 101*b* may be other types of computing devices that transmit and receive RF signals in a cellular network 100B. UE 101*b* may include a processor, memory, transceiver and user interface.

As described herein, cellular network 100B may have a plurality of cells 101-107, which may be grouped or clustered/sub-clustered. For example, cells 101-104 may form a first cluster and cells 105-107 may form a second cluster. The first cluster may be further grouped into a first sub-cluster including cells 101-102 and a second sub-cluster including cells 103-104.

In a cellular network 100B, various parameters may be configured so that the network can operate at an acceptable or optimal level of performance. Such parameters may include, but are not limited to, the transmission power of the cells, a threshold of the number of UE (where the sum of the threshold can trigger load balancing, if exceeded), a threshold of the number of UEs which can terminate triggered load balancing if the threshold is no longer met, etc. Configuring the parameters or setting the parameters to certain values allows the network to achieve better performance or a better quality of performance.

To measure the performance or quality of performance, the network may be monitored using indicators, such as key quality indicators (KQIs) and key performance indicators (KPIs). The KQI measures quality and can include, for example, the average packet loss, the average packet delay, call drop rate, the average UE throughput, etc. For example, the KQI(s) may be used as an indication of the quality of network performance, such as the quality of service (QoS) to end users. Such QoS may be measured, for example, by monitoring an average UE throughput (i.e., the average of the throughput of a set of UEs) to indicate how well the network is performing.

Similarly, the KPI may be used as an indication of network performance. KPI(s) can include, for example, the reference signal received power (RSRP), physical downlink control channel (PDCCH) interference, the handover (HO) failure rate, etc. For example, a KPI may indicate the network performance, such as how many users are in the system, the interference level of the cells in the wireless system, etc.

For these indicators to reliably yield suitable network performance or quality of performance, the afore-mentioned parameters need to be set such that the performance or quality of performance levels are optimized. That is, the parameters should be configured or set to certain values such that the KQI (e.g., the average UE throughput) can be higher, or the KPI (e.g., the number of UEs in cells) can be at a reasonably healthy level so the network can provide reasonably good quality of the services to the UEs.

In one embodiment, the parameters themselves may fall into different categories. For example, for parameters in a first category, the value of the parameters impact the outcome of the measured KQI and KPI in the network. That is, parameters configured with or changed to (re-configured) a specific value directly affects the outcome of the measured KQI and KPI In this case, the parameters are said to be reflected to the KQI and KPI via data samples collected in the network. For purposes of discussion, parameters that are reflected to the KQI and KPI are referred to herein as Category_1 parameters.

In one embodiment, a determination of whether the parameter configurations result in a change to the KQI and KPI includes determining a relationship between the parameter configurations and the KQI and KPI. For example, the relationship may be determined by a correlation relationship, a functional relationship, a regression analysis relationship, and a relationship by mapping a function of the parameter configurations to the KQI(s) and KPI(s).

Parameters reflected to the KQI and KPI may be recognized, for example, using data samples collected from the network. For example, if a parameter for the transmission power level is lowered, the data samples collected from the network will indicate an increase in the KQI that measures call drop rate.

In another embodiment, configuration of the parameters may, but do not always, impact the KQI and KPI (i.e., are not always reflected in the KQI and KPI) from the collected data samples. For purposes of discussion, this set of parameters is referred to herein as Category_2 or threshold parameters.

To determine whether these Category_2 parameters are reflected to the KQI and KPI may additionally depend on various conditions, such as the status of an operation in the network. For example, the Category_2 parameters may be related to operations, such as HO operations, load balancing operations, measurement operations, etc. The status of an operation, such as whether an HO operation has been triggered or successfully executed, may impact the outcome of the KQI and KPI measurements.

Figure 2:
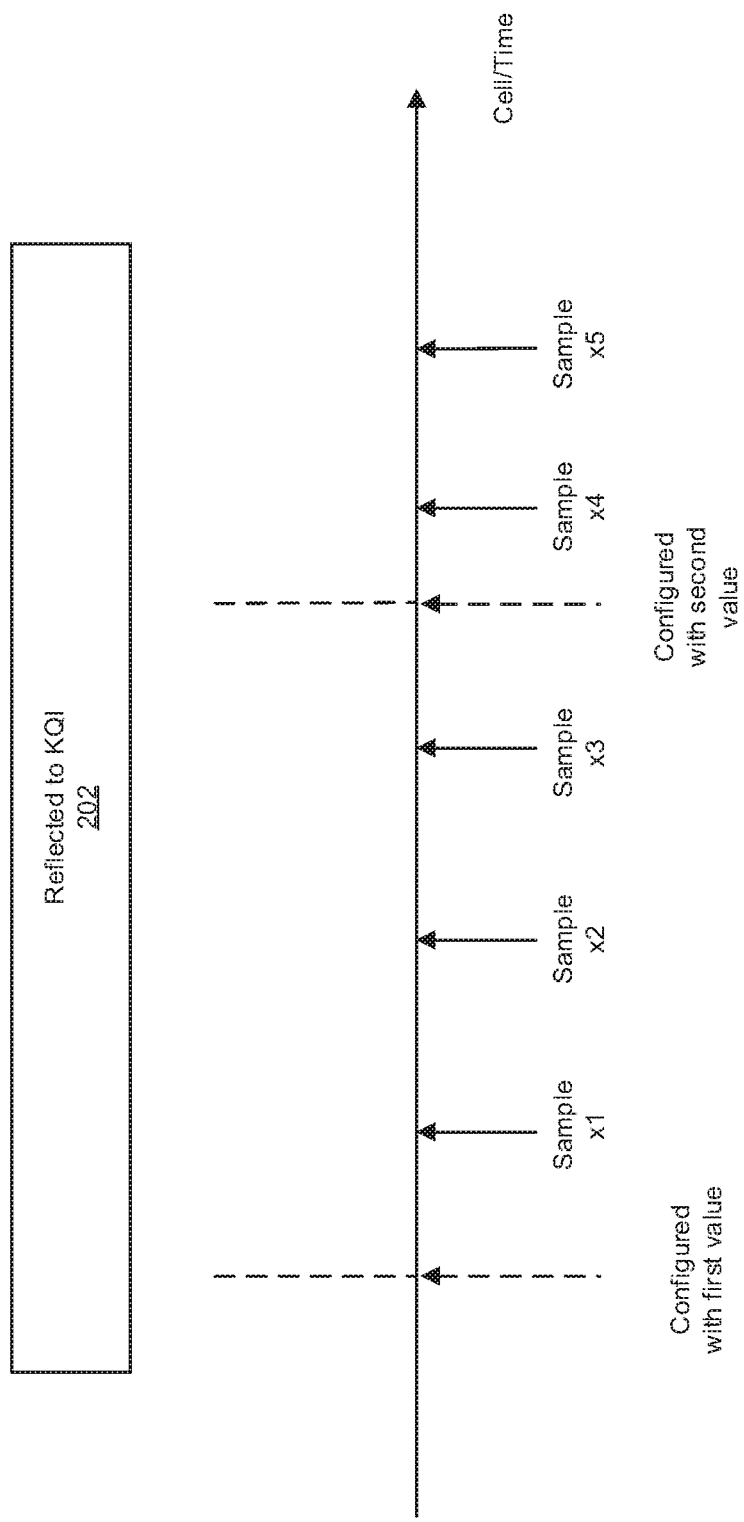
FIG. 2 illustrates an example of parameters that cause a change in outcome to network indicators.

FIG. 2 illustrates an example of parameters that result in changes to KQI or KPI measurements. The parameters discussed with reference FIG. 2 are Category_1 parameters, the parameters will be reflected to the KQI or KPI at 202 via collected data samples x1-x5, regardless of the configuration or value of the parameter. Accordingly, the Category_1 parameters will be used to configure the parameters for optimization such that network performance is also optimized.

In one embodiment, the parameters may be optimized by adjusting the values of the parameter(s) and determining how the adjustment results in a change to the KQI or KPI measurements. Optimizing or tuning the parameters will typically result is optimized network performance. In one embodiment, the adjustment is automatic. In another embodiment, the adjustment is manual or a combination of automatic and manual.

To monitor and evaluate network performance based on the configured parameter(s), the KQI or KPI may be sampled (i.e., observed) over a period of time (e.g., periodically sampled with a periodicity such as minutes, seconds, etc.) or based on events or a status of events that occur in the network 100 (e.g., periodically check to see if the average packet delay has changed). In this manner, when a parameter(s) or value of the parameter(s) is changed (or reconfigured), the samples of the KPI or the KPI can be observed and utilized for analysis to identify which of the parameter(s) result in the best network performance. In one embodiment, data samples collected for Category_1 parameters may be used.

In one example, assume for purposes of discussion that the cell 101 in network 100 is being monitored to determine the KQI for the average packet delay (i.e., KQI=average packet delay). The parameter may be initially configured with a first value and subsequently adjusted (re-configured) to a second value, as depicted in the figure. Here, the data samples x1-x3 represent the average packet delay when the parameter is set to the first value, and the samples x4-x5 represent the average packet delay when the parameter is configured to the second value. If the collected data samples x1-x3 indicate that the average packet delay when the parameter is set to the first value is less than the parameter after being adjusted to the second value (the collected samples x4-x5 thus indicate the average packet delay is greater after the parameter adjustment), then the parameters will be configured to the first value (where the delay is less) to achieve optimal results.

More specifically, in one non-limiting example, the parameter is a downlink transmission power to be optimized such that network performance is improved or enhanced. In the example, when the downlink transmission power for a cell (such as cell 101) is increased or decreased (adjusted), the average UE throughput (KQI) of the cell 101 also changes to reflect the adjustment. Such an increase or decrease in the downlink transmission power may be recognized by monitoring the KQI to detect the change in the average UE throughput, as measured using the collected data samples x1-x5.

Figure 3A:
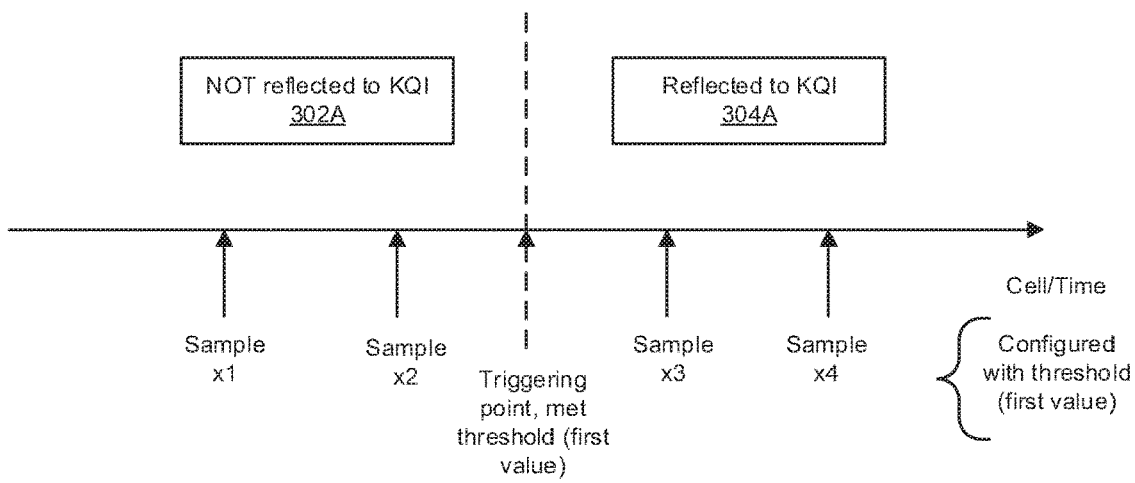
FIGS. 3A-3C illustrate additional examples of parameters that may cause a change in outcome to network indicators.
Figure 3B:
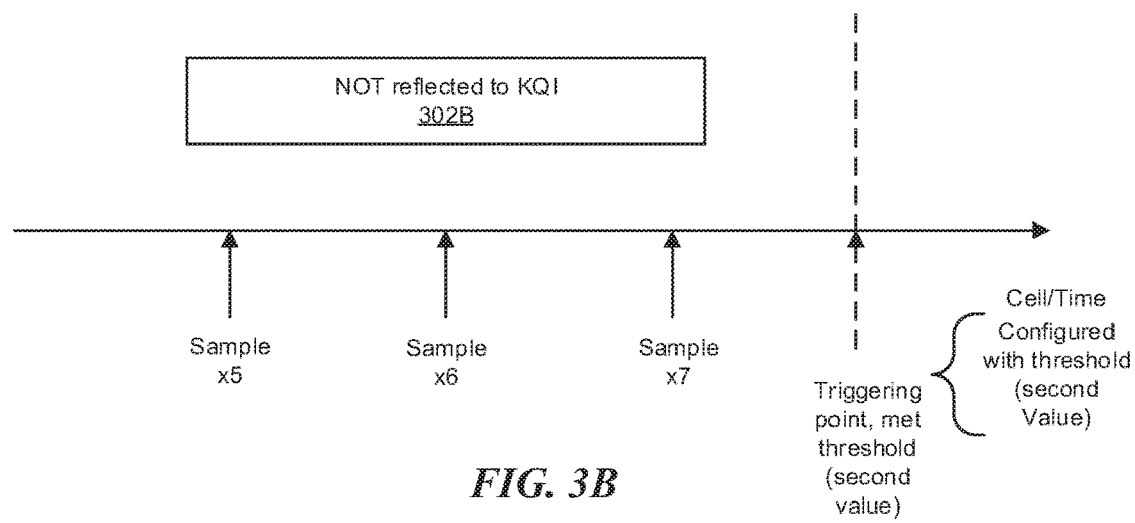
Figure 3C:
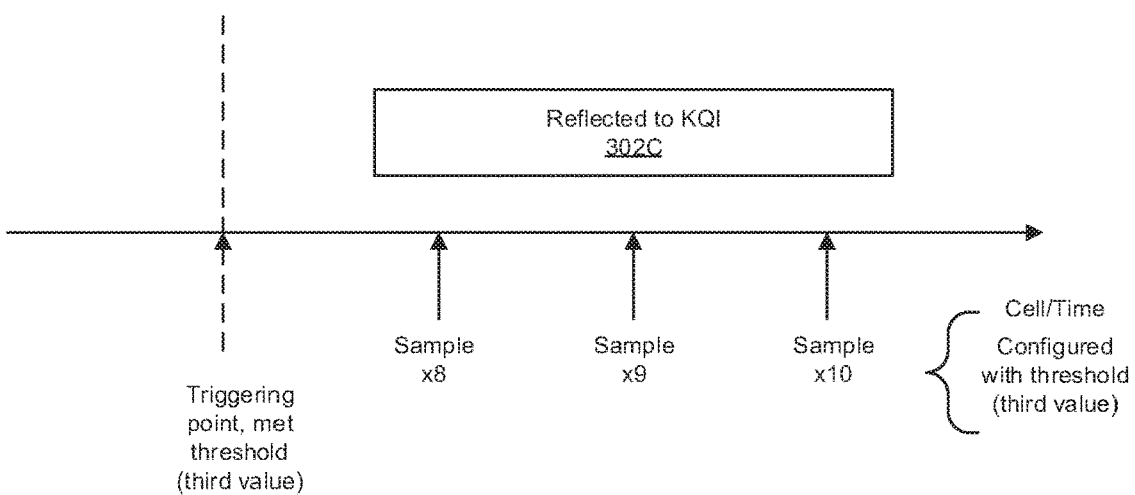

FIGS. 3A-3C illustrate examples of parameters that may result in changes to KQI or KPI measurements. When the parameter(s) are Category_2 parameters, and the parameter value is adjusted (i.e., the configuration of the parameter changes), the adjusted parameter value is not always reflected to the KQI or KPI by the collected data samples. Rather, whether the data samples reflect the parameter to the KQI or KPI depends on conditions in the network—e.g., whether a threshold for an operation is triggered and/or whether the operation is executed successfully. These operations may be, for example, at the physical (PHY) layer, the media access control (MAC) layer, the radio link control (RLC) layer, the application layer, or other upper layer or cross layers which may include multiple layers.

Category_2 parameters (or threshold parameters) may include, but are not limited to, a variety of different parameters: (1) the threshold for load balance triggering, the threshold for HO related measurement triggering, etc.; (2) offsets, such as offsets in conditions related to HO, in conditions related to measurement reporting related events, where the events are typically defined as conditions, etc.; (3) hyst (hysteresis), such as the hyst parameter in the condition related to HO, the conditions related to the measurement reporting related events, etc.; (4) parameters within an expression of the triggering conditions, such as thresholds, offsets and hyst. For example, to trigger an A3-event (in which a neighboring cell becomes better than the serving cell by an offset) based inter-frequency HO, if the condition Mn+Ofn+Ocn-Hyst>Ms+Ofs+Ocs+Threshold, the A3-event based HO is triggered, where Mn and Ms are the measurements of the neighboring cell and serving cell, respectively. Mn and Ms, as the terminology suggests, are not parameters. Rather, they refer to measurements of the neighboring and serving cells. All other terms in the condition are parameters which may be optimized, where Ofn and Ocn two offsets related to the neighboring cell, Ofs and Ocs are offsets related to the serving cells; (5) composite parameters which can have multiple parameters as a joint parameter of multiple dimensions. For example, a joint multi-dimensional parameter as (hyst, threshold); and (6) newly defined parameters, such as parameters defined as an expression, related to operations triggering conditions. For example, a newly defined parameter can be para_1=Threshold+Ocs+Ofs-Ocn-Ofn+Hyst, which is an expression derived from the triggering condition for A3-event based HO.

Optimal values of the parameters can be obtained directly from machine learning (using any machine leaning technique, described further below), or can be derived or calculated from the newly defined parameters whose optimal value is obtained from the machine learning. For example, if all parameters other than the threshold value remain fixed (i.e., do not change), the threshold value in an A3-event based HO triggering condition can be machine learned and obtained directly from the machine learning. In another example, a composite parameter may be optimized. If the composite parameter is two-dimensional, such as (Threshold, Hyst), it may be defined as para_2=Threshold+Hyst (which is related to a triggering condition), para_3=Threshold-Hyst (which is related to a cancellation condition of the triggering). Applying this definition, optimal para_2, para_3 can be learned from machine learning, and the two-dimensional parameter (Threshold, Hyst) can be derived as: Threshold=(para_2+para_3)/2, and Hyst= (para_2−para_3)/2.

In examples illustrated in FIGS. 3A-3C, the Category_2 parameters are a threshold value. When the threshold value (e.g., first value) is satisfied, various operations may be triggered in the network 100. For example, for mobile load balancing (MLB) in a cell, when the number of uplink synchronized users is greater than (UE_number_threshold+ UE_number_offset), the MLB for the cell will be triggered, and UEs in the cell may be transferred to neighboring cells (where the neighboring cells are less crowded). In the examples, the UE_number_threshold and the UE_number_ offset are parameters related to the threshold value to trigger MLB. For simplicity of the discussion that follows, only the UE_number_threshold parameter is adjusted for optimized network performance.

A cell, such as cell 101 (FIG. 1), may be monitored or observed over a period of time for Catergory_2 parameters, as represented by the horizontal axis line. As the parameter(s) in the cell 101 are adjusted over time, data samples x1-x10 are collected from the network 100. An adjustment of the parameter(s), as explained above, often impacts network performance and may (or may not) be reflected to the KQI or KPI measurements.

In the examples of FIGS. 3A-3C, three different scenarios are illustrated. In a first scenario (FIG. 3A), the threshold value (e.g., UE_number_threshold) is set to trigger operations at a first value. Data samples x3-x4 are collected after operations are triggered, thereby resulting in the parameters(s) being reflected to the KQI or KPI at 304A. For example, when the number of UEs in one cell reaches or exceeds the threshold value (first value), a select number of UEs are transferred to another cell (for example, a cell with a number of UEs not satisfying the threshold value). Otherwise, operations are not triggered and data samples x1-x2 collected from the network 100 are not reflected to the KQI or KPI at 302A (i.e., the parameter values do not affect the outcome of the measures KQI or KPI).

In another example, the threshold value (e.g., UE_number_threshold) is also set to trigger operations at a first value. Thus, when the threshold value is not met, the operation is not triggered. For example, for an MLB operation, the number of the uplink synchronized UEs may fall below the threshold value (e.g., UE_number_threshold+fixed value of UE_number_offset<first value). In this case, data samples x1 and x2 are not reflected to the KQI or KPI at 302A since the data samples x1 and x2 were obtained before the MLB operation was triggered. Similarly, parameters related to MLB that are collected as data samples prior to triggering will not be reflected to KQI or KPI at 302A.

After the triggering point, (e.g., after the MLB operation is triggered as a result of satisfying the threshold value), the first value is reflected to the KQI or KPI at 302B. For example, the data samples x3 and x4 reflect the first value of the UE_number_threshold to the KQI and KPI. Similarly, parameters related to MLB that are collected as data samples at or after triggering will be reflected to the KQI or KPI at 304A. In one embodiment, in addition to satisfying the threshold value, one or more conditions should also be satisfied in order for the related parameters to be effective, thereby allowing the collected data samples x3 and x4 to be reflected to the KQI or KPI.

In a second scenario (FIG. 3B), the threshold value (e.g., UE_number_threshold) is set to a second value. Data samples x5-x7 are collected prior to operations being triggered since the threshold value has not been satisfied. For example, as illustrated, none of the data samples x5-x7 are reflected to the KQI or KPI at 302B since the threshold value (triggering point) is never satisfied when the data samples x5-x7 are collected.

In a third scenario (FIG. 3C), the threshold value (e.g., UE_number_threshold) is set to a third value. In this example, operations are triggered prior to any data samples x8-x10 being collected from the network 100 since the threshold value has been satisfied. Accordingly, all of the data samples x8-x10 are reflected to the KQI or KPI at 302C.

Figure 4:
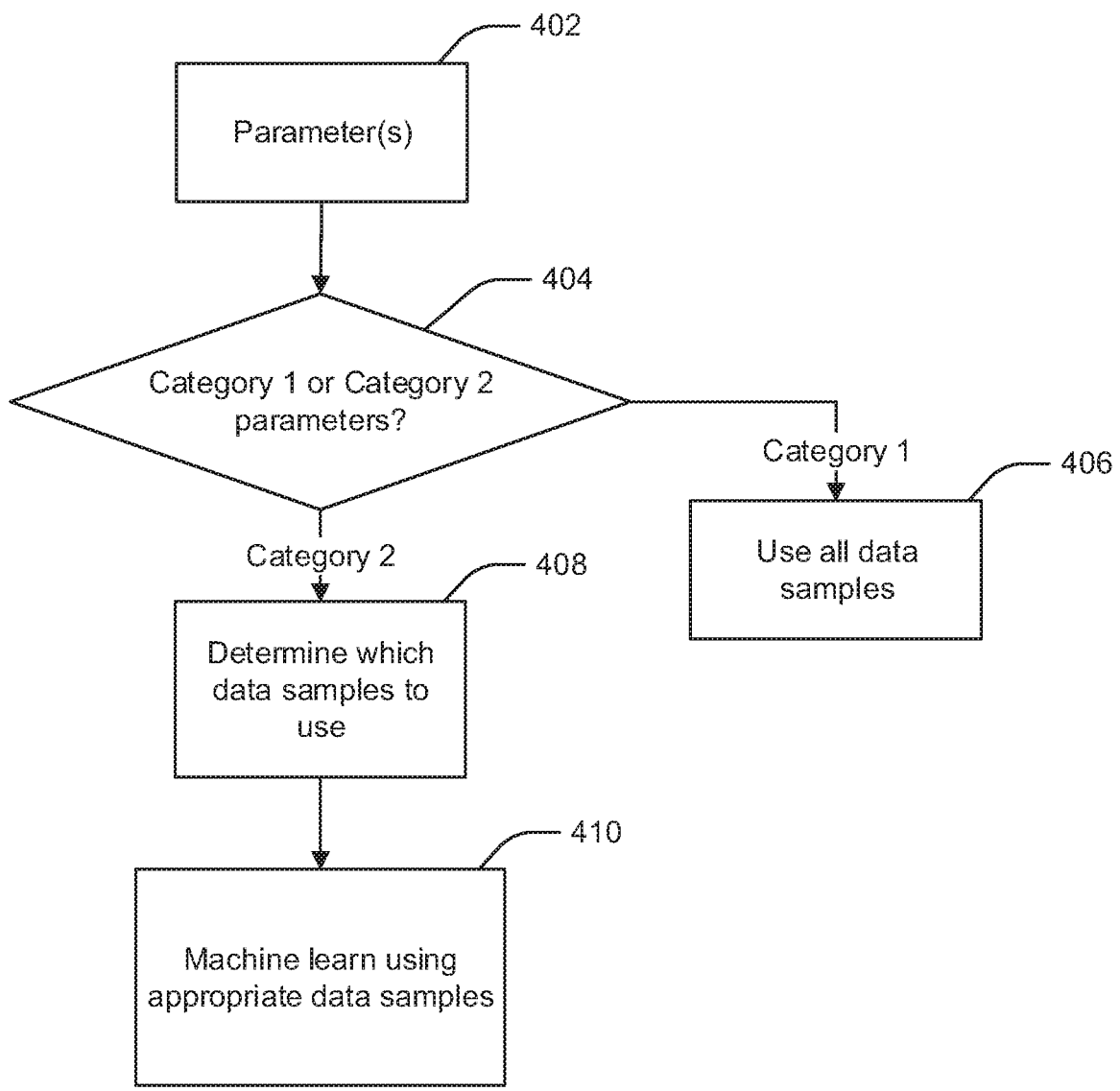
FIG. 4 illustrates a flow diagram to separate parameter into categories.

FIG. 4 illustrates a flow diagram to differentiate parameters into categories. In embodiments, the flow diagrams in FIGS. 4-9 are computer-implemented methods performed, at least partly, by hardware and/or software components illustrated in FIGS. 1A, 1B, 13 and 14 and as described below. In an embodiment, software components executed by one or more processors, such as processor 1308 shown in FIG. 13 or CPU 1410 shown in FIG. 14, perform at least a portion of the methods. However, it is appreciated that the methods are not limited to being performed by the above-mentioned components, and that any component in the systems and networks descried in FIGS. 1A, 1B, 13 and 14 may be used to implement the methods described herein.

As explained above, parameters may be differentiated into distinct categories (Category 1, Category 2) based on (1) whether the configurations or the values of the parameters are reflected to KQI or KPI via collected data samples, or (2) whether the configurations of the values of the parameters are reflected to KQI or KPI depending on conditions or operational status. Once the parameters have been categorized, the collected data samples may be processed using various machine learning techniques. Machine learning techniques are described below in detail with reference to, for example, FIG. 9A (describing a specific machine learning embodiment) and more generally FIG. 13. It is appreciated that any well-known machine learning technique may be applied.

In the disclosed embodiment, operating parameters are configured at 402. In some instances, the operating parameters may be configured by operators after analyzing the network to determine network performance based on the configured parameters. In other embodiments, the operating parameters are automatically configured using machine learning in accordance with embodiments of the present disclosure.

At 404, the parameters are determined to be categorized into Category_1 or Category_2 parameters. For a parameter identified as Category_1 at 404, all of the collected data samples, such as data samples x1-x5 in FIG. 2, can be used to determine the optimal parameter value for configuration using machine learning that yields the best KQI and KPI, and therefore best or optimal network performance. That is, all data samples collected from the network for Category_1 parameters may be used to determine the optimal parameter value since the parameters result in a change to the KQI or KPI measurements (i.e., the configured parameter directly affects the outcome of the KQI and KPI measurements).

Parameters identified as Category_2, at 404, require further analysis at 408 to determine which of the data samples (e.g., data samples x1-x4 in FIG. 3A) may be used in the process of identifying the optimal parameter value. In one embodiment, analysis includes determining how the data samples x1-x4 should be divided into subset(s) in order for the system to learn the optimal configuration for a specific parameter. In one embodiment, the data samples x1-x4 are divided based on various conditions being satisfied. The methodologies employed to determine how to divide the data samples are described below with reference to FIGS. 5-9.

For the data samples determined for use at 408, machine leaning is applied to the data samples to recommend or predict how best to configure the parameters in the network to yield the best or optimal results at 410.

Figure 5:
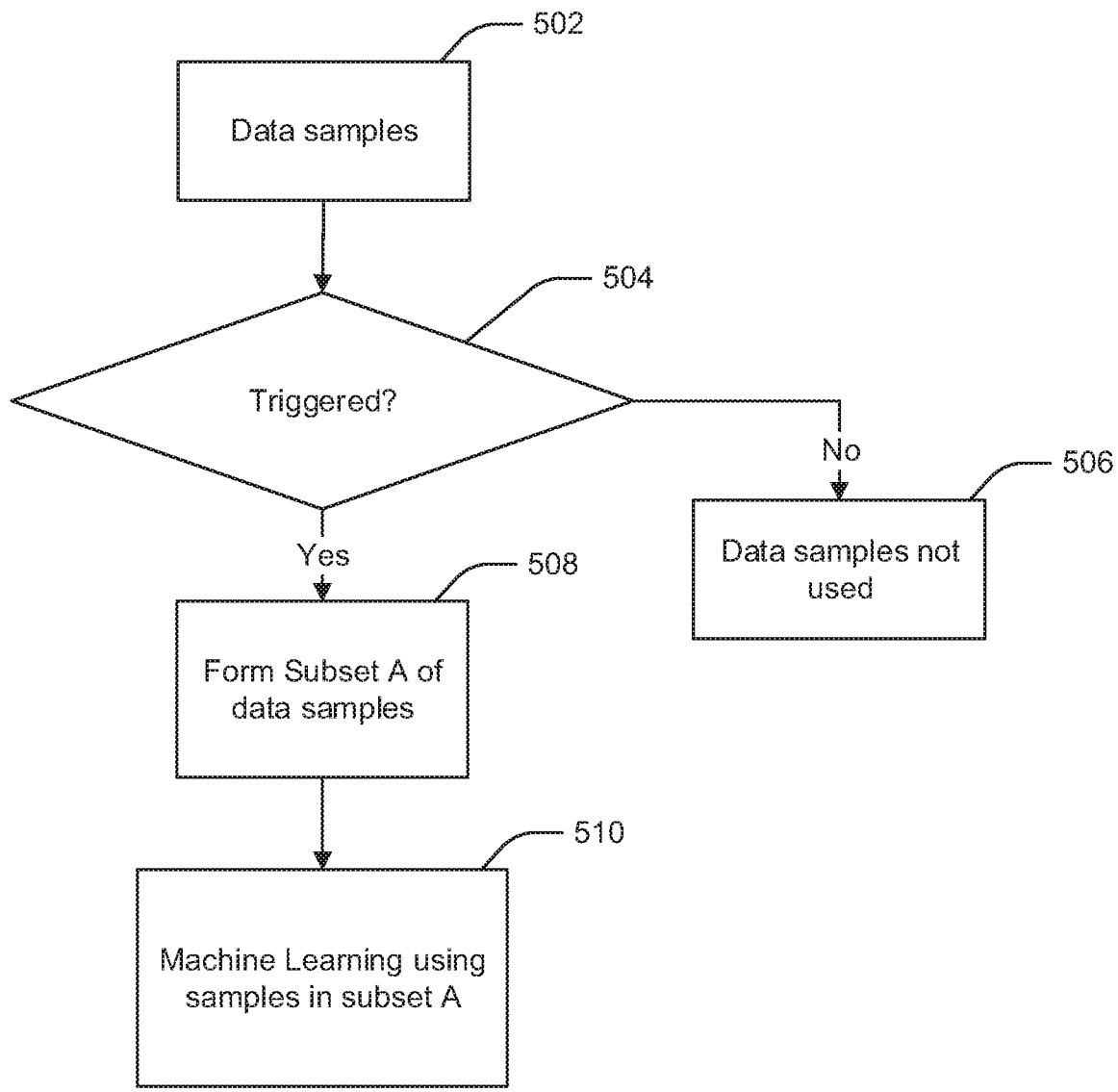
FIG. 5 illustrates a flow diagram for a first embodiment to select data samples for use in machine learning.

FIG. 5 illustrates a flow diagram to select data samples for use in machine learning. In particular, the methodology described in the figure determines which of the data samples to use in machine learning by dividing or separating the category_2 data samples into subsets. The separation of the data samples into categories in the example of FIG. 5 is based on a condition that satisfies a triggering threshold being met.

The data samples at 502, for example the determination made at 408 in FIG. 4, are divided into subsets based on a determination as to whether a specific operation has been triggered or a triggering threshold has been met in the network at 504. For example, a triggering threshold may be a specified number of UEs exceeding a maximum number for any one cell before mobility load balancing occurs, or triggering of the MLB operation based on some event.

For the data samples collected prior to the specific operation being triggered (e.g., prior to MLB) or a triggering threshold having been satisfied (e.g., sufficient cell congestion to trigger MLB), the data samples are discarded and not used at 506. For the data samples collected after the MLB operation has been triggered or for which the MLB triggering threshold has been satisfied, a subset A of samples is formed at 508. The subset A of data samples will include the data samples related to the MLB triggering conditions (MLB threshold or MLB triggered), which data samples have been collected during the period of time when the MLB was triggered (or MLB is triggered at some instance of time during the period for which the data samples are collected). This subset A of data samples may then be used to learn the best configurations (values) for parameters related to the MLB triggering conditions.

At 510, the data samples in subset A are used as an input (into a trained model, as explained below) for machine learning to learn the configurations for the parameter to yield the optimal KQI or KPI and provide a recommendation or prediction as an output. As noted above, the machine learning techniques employed to determine the best or optimal configurations for the parameters may be any well-known machine learning technique. For example, machine learning may include, but is not limited to, decision tree learning, association rule learning, artificial neural networks, deep learning, clustering, Bayesian networks, rule-base machine learning and the like, as well as the embodiments discussed with reference to FIG. 13 below.

Figure 6:
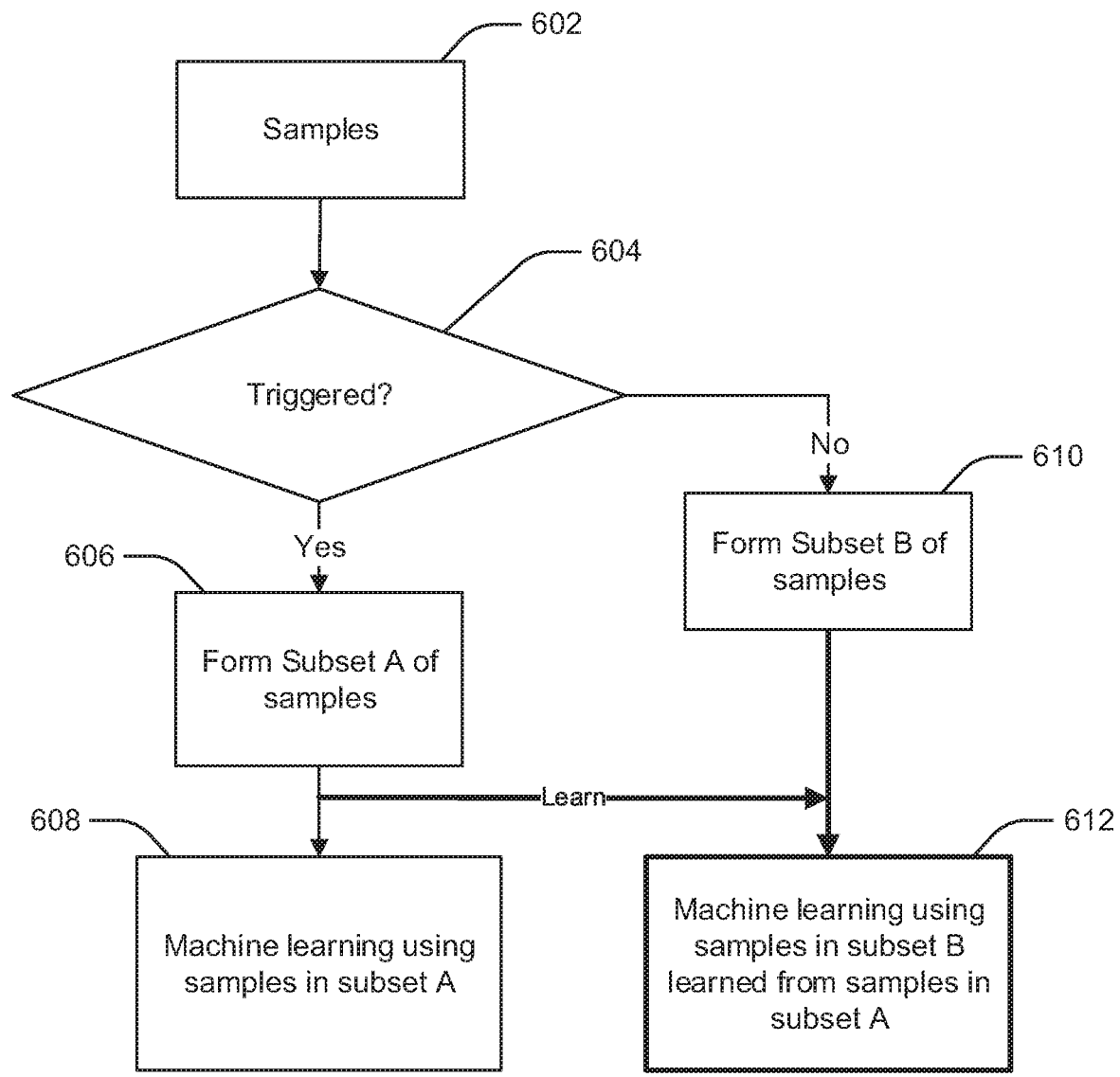
FIG. 6 illustrates a flow diagram for a second embodiment to select data samples for use in machine learning.

FIG. 6 illustrates a flow diagram to select data samples for use in machine learning. In particular, the methodology described in the figure expands upon the machine learning of FIG. 5 by forming another subset of data samples (subset B), comprised of the unused data samples, which is later trained or learned from the configuration of parameters corresponding to the subset A of data samples (or vice versa).

Procedures 602-610 in FIG. 6 correspond to procedures 502-510 in FIG. 5. Procedure 612 is newly added, along with training of data samples. The data samples are divided into two categories—catergory_1 and category_2, at 602, dependent upon whether the data samples satisfy the triggering threshold or an operation is triggered at 604. For the data samples corresponding to the operation effectively triggered or the triggering threshold being satisfied, subset A is formed at 606. Otherwise, subset B is formed from the data samples failing to satisfy the requirements at 610. The data samples in subset A are used as an input (into a trained model, as explained below) for machine learning to learn the configurations for the parameter to yield the optimal KQI or KPI and provide a recommendation or prediction as an output at 608.

At 612, the data samples in subset B (data samples that have not satisfied the threshold trigger or triggered an operation) are used as an input (into a trained model, as explained below) for machine learning to learn the configurations for the parameter to yield the optimal KQI or KPI and provide a recommendation or prediction as an output. In this case, the data samples from subset B may learn from the parameter configurations corresponding to the data samples in subset A (or vice versa). The machine learning techniques employed to determine the best or optimal configurations for the parameters may be any well-known machine learning technique, as described above.

Figure 7:
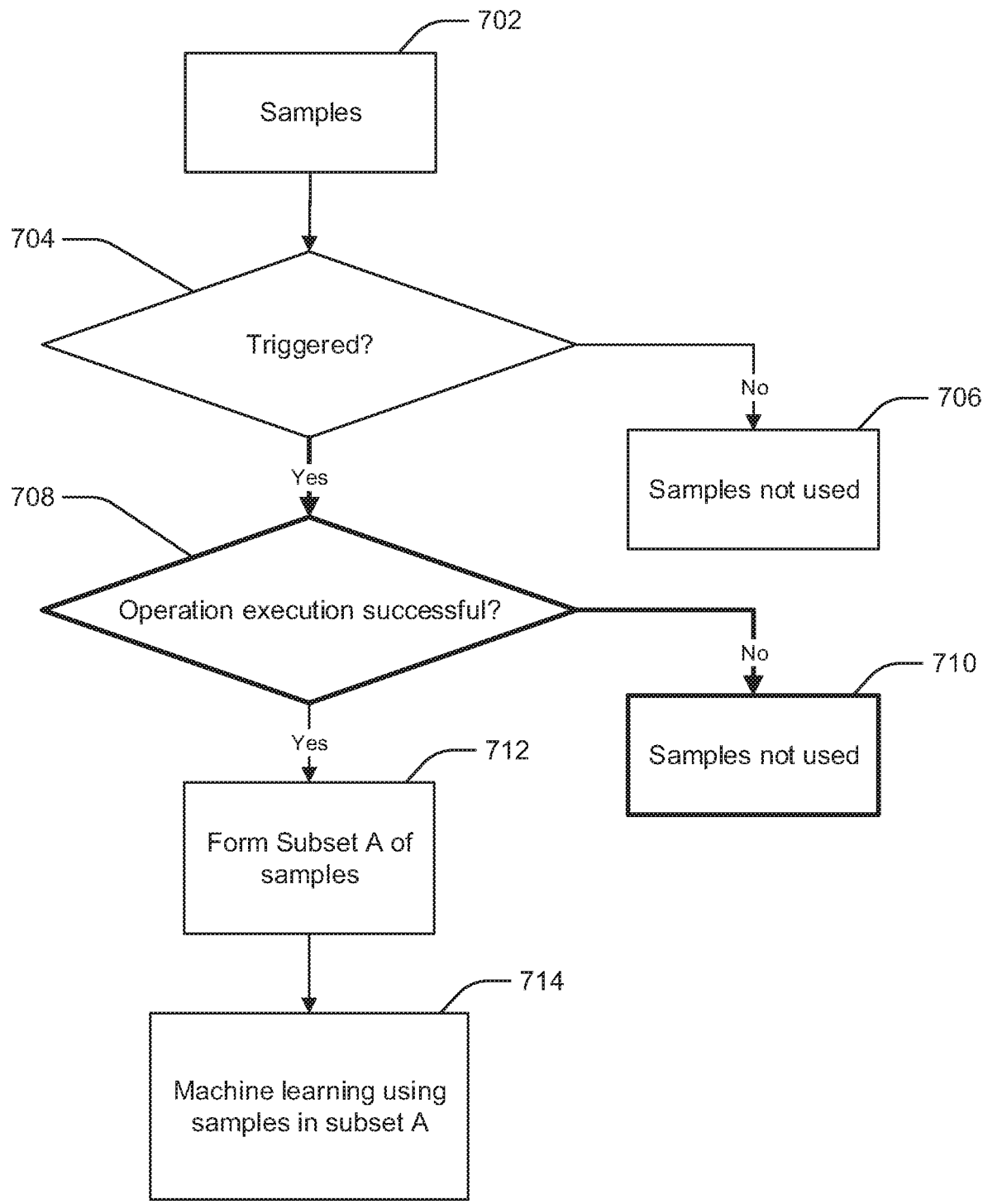
FIG. 7 illustrates a flow diagram for a third embodiment to select data samples for use in machine learning.

FIG. 7 illustrates a flow diagram to select data samples for use in machine learning. In particular, the methodology described in the figure expands upon the machine learning of FIG. 5 by adding another condition (execution of an operation) that the data samples should satisfy before forming subset A.

Procedures 702-706 and 712-714 in FIG. 7 correspond to procedures 502-510 in FIG. 5. Procedures 708 and 710 are newly added. Data samples corresponding to Category_2 parameters are received at 702. The data samples are divided or separated into subsets dependent upon whether the data samples satisfy the triggering threshold or an operation is triggered at 704. For data samples failing to satisfy the triggering requirement, the data samples may be discarded at 706. For the data samples corresponding to the operation being triggered or the triggering threshold being satisfied, a further determination is made as to whether any operation has been successfully executed at 708.

If it is determined that the operation has been successfully executed at 708, then the corresponding data samples form subset A at 712. Otherwise, the data samples are not used at 710 and may be discarded.

At 714, data samples that have been selected at 712 may be used as input to machine learn the optimal configuration for the parameters. That is, the data samples in subset A are used as an input (into a trained model, as explained below) for machine learning to learn the configurations for the parameter to yield the optimal KQI or KPI and provide a recommendation or prediction as an output. The machine learning techniques employed to determine the best or optimal configurations for the parameters may be any well-known machine learning technique, as explained above.

Figure 8:
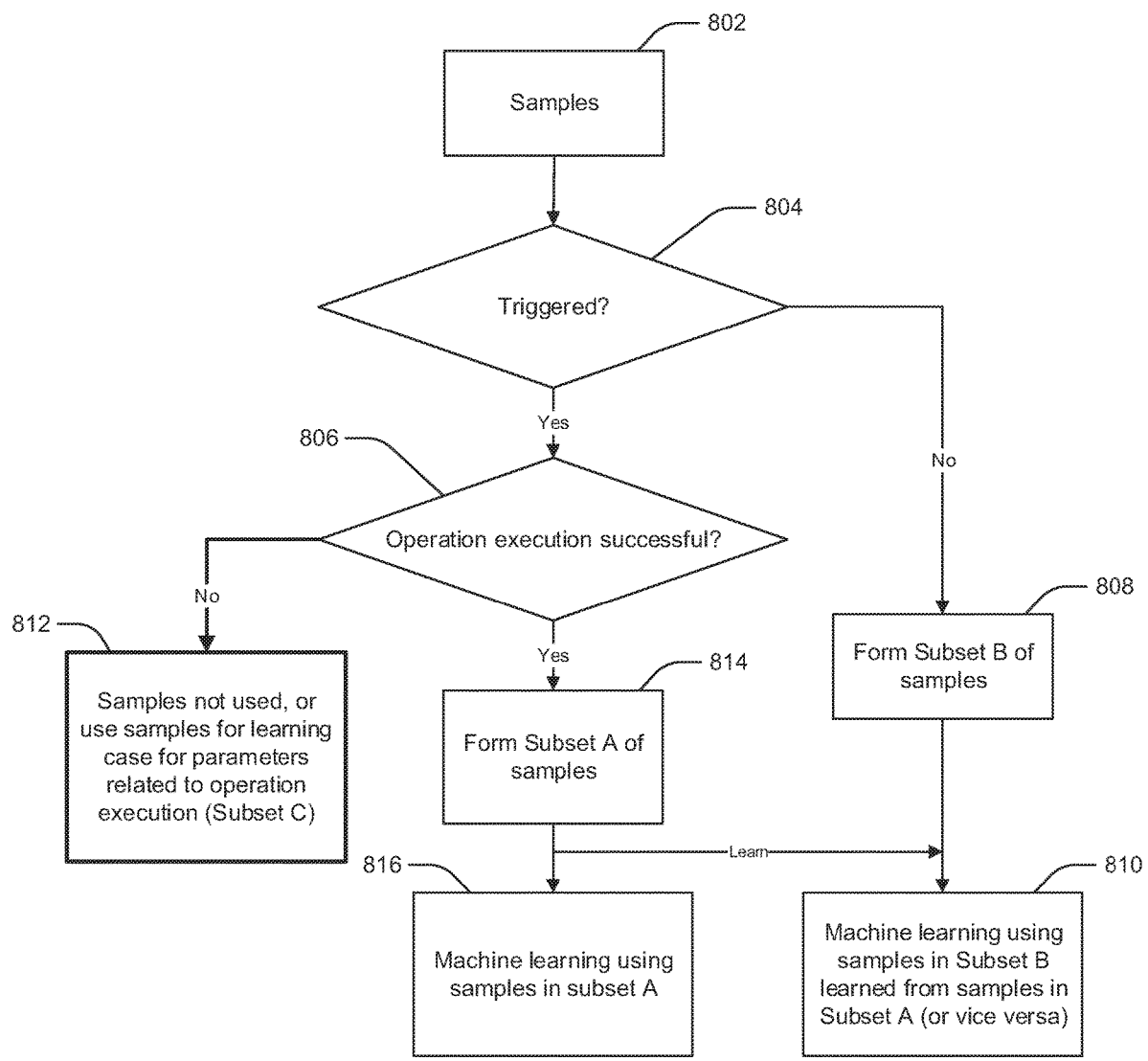
FIG. 8 illustrates a flow diagram for a fourth embodiment to select data samples for use in machine learning.

FIG. 8 illustrates a flow diagram to select data samples for use in machine learning. In particular, the methodology described in the figure expands upon the machine learning of FIG. 6 by adding another subset of data samples and another condition (execution of an operation) that should be satisfied when forming the data sample subsets.

The procedures 802-804, 806 and 814-816 correspond to the procedures 702-704, 708 and 712-714 in FIG. 7, and procedures 808-810 correspond to procedures 610-612 in FIG. 6, a discussion of which is not repeated. At 812, when determining an operation has not been successfully executed, the collected data samples (subset C) are (a) not used (and may be discarded), or (b) used for learning where the parameters are related to operation execution. For example, in a MLB operation, if the MLB is triggered, operation execution will be related to handing over UEs to neighboring cells. Thus, the parameters related to operation execution can include, for example, the MLB-based handover parameters. Further explanation is found below with reference to FIG. 11C.

Figure 9A:
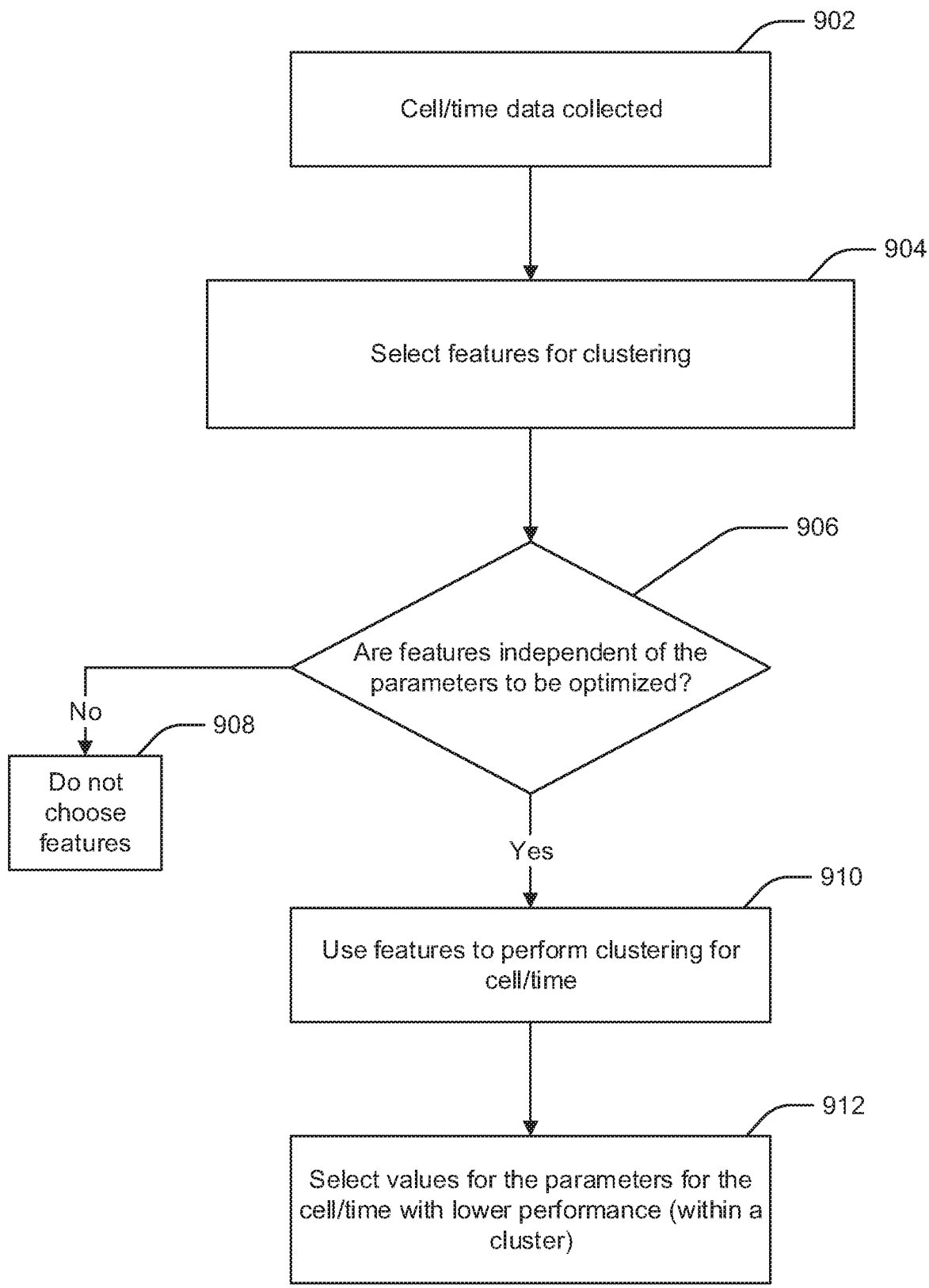
FIG. 9A illustrates one embodiment of machine learning that includes intelligent clustering.

FIG. 9A illustrates one embodiment of machine learning that includes intelligent clustering. The intelligent (or "smart") clustering technique uses features selected to perform clustering to be used in determining configurations for the parameters to be optimized. The intelligent clustering is one example embodiment of machine learning that may be employed to automatically tune parameters to enhance performance. As explained above, any number of machine learning techniques may be employed, and the disclosure is not limited to the disclosed embodiment.

At 902, cell and time data is collected for each of the cells, such as cells 101-107 in FIG. 1B.

In one embodiment, groups of cells are clustered by selected features for a given time period at 904. For example, cells in a network are put into groups or clusters for a given time period, where each cell has the same (or nearly the same) features. For example, the feature in each cluster of cells may be an average throughput time for all UEs in the cell.

In one embodiment, the selected features are related to or a predictor of performance, such that the selected features impact (e.g., cause a change in the resulting KQI and/or KPI measurements) the outcome of the KQI and KPI measurements in the network. For example, the features may be related to the number of UEs in the serving cell in a HO operation.

In another embodiment, the selected features are independent (or nearly independent) of the parameters to be optimized (i.e., parameters to be tuned or configured). For example, the average number of UEs of a serving cell and its neighboring cells related to an HO operation. In still another embodiment, the selected features are both related to or a predictor of performance and independent (or nearly independent) of the parameters to be optimized.

In one embodiment, the performance of the KQI or KPI modeling via clustering can be measured as, for example, but not limited to, an R-square score, average prediction error (relative error, or absolute error), etc. In this embodiment, to determine whether a feature has an impact on the KQI or KPI measurements, a predictive power of the feature may be used. For example, the predictive power may utilize an importance score of a Principle Component Analysis (PCA), where a higher score signifies a greater impact on the resulting KPI or KPI measurements. In another example of predictive power, model performance differences may be compared when applying or excluding different features. For example, a first R-square score (or prediction error) of the model using the feature maybe determined, and a second R-square score (or prediction error) of the model excluding the feature in clustering is determined. The difference between the first and the second R-square score (or the difference of the first prediction error and the second prediction error) may then be compared, where a larger difference is indicative of the higher the importance (more impact) of the feature to the KQI or KPI measurements.

In one other embodiment, if a feature does not correspond to an existing KQI and/or KPI, one may be created, for example, by forming an expression or a function of one or multiple existing KQI(s) and/or KPIs.

At 906, the selected features are analyzed to determine whether they are independent (or nearly independent) of the parameters to be optimized. To determine whether a feature is independent (or nearly independent) to the parameters being optimized, different mechanisms may be implemented. For example, mechanisms may include, but are not limited to, the correlation score of the feature and the parameter values, the physical meaning or mechanisms, or domain knowledge, to determine whether the change of the values of the parameters impact the identified feature, or whether the change of the feature would have any impact on the change of the parameter configuration.

The physical meaning or mechanisms, as used herein, refer to the principles of the system or how the system is constructed and how the system operates. For example, by transmitting power at the downlink, the power should be independent of the KPI of the ratio of the uplink small-sized packets among all packets. This is because the uplink small packet ratio is the aspect of the application, or the incoming traffic property of the uplink, and the uplink small-sized packets should not have any direct or strong dependency towards the downlink transmitting power. However, the downlink transmitting power should have a strong correlation with the downlink reference signal received power (RSRP). The downlink transmitting power should also have strong correlation with the downlink channel quality indicator (CQI), and the downlink CQI should have a very strong correlation with the downlink modulation coding scheme (MCS), since the higher order of the MCS is typically used for good CQI, while lower order of the MCS is typically used for bad channels (these are determined by the communication principles).

If (1) the correlation is weak, (2) the causal relationship is weak in both directions (i.e., the causal relationship is weak either from a first factor to a second factor, or vice versa, where the factor may be, for example, parameter (KPI, KQI). That is, the first factor is not the cause (or a very weak cause) of the second factor, or vice versa), or (3) by physical mechanisms, the independence of the feature and the parameter configurations is strong, then the independent or nearly independent relationship can be identified.

For example, a feature to optimize a HO related parameter, e.g., an HO related A2, A3, A4 event parameter, is highly related to the number of UEs in the serving cell. Thus, the feature is not independent of the parameters and may not be used in clustering. Features that fall into this category (not independent of the parameters to be optimized) are not selected at 908. On the other hand, if the feature is related to the average number of UEs of the serving cell and its neighboring cells (especially those neighboring cells relate to the HO operations), the feature is not related (or only tangentially related) to the parameter. Accordingly, the feature is independent of the parameter(s) to be optimized. Accordingly, the feature may be selected as the features for clustering at 910.

In another example, when optimizing a transmission (TX) power parameter, a change in the TX power will affect the channel quality indicator (CQI) measurement. Thus, the CQI is directly related to the parameter and should not be used as the feature for clustering. On the other hand, the timing advance (TA), which is a strong indicator of the distance from the UE to the base station, may be selected as the feature for clustering as it is independent of the parameter (TX power) being optimized.

At 912, after determining which feature(s) are independent of the parameter(s) being optimized, and for each cluster of cells (where each cluster has a group of similar cell(s)/time(s) based on the selected features), values for the parameters to be optimized are selected for the cell(s)/time(s) having a lower performance within a cluster. For example, the parameters (or configuration of the parameters) can be optimized by comparing the performance of the network to the values of the parameters, and selecting the parameters corresponding to the highest network performance as the optimal parameters, a graph of which is illustrated in FIG. 9B.

Figure 9B:
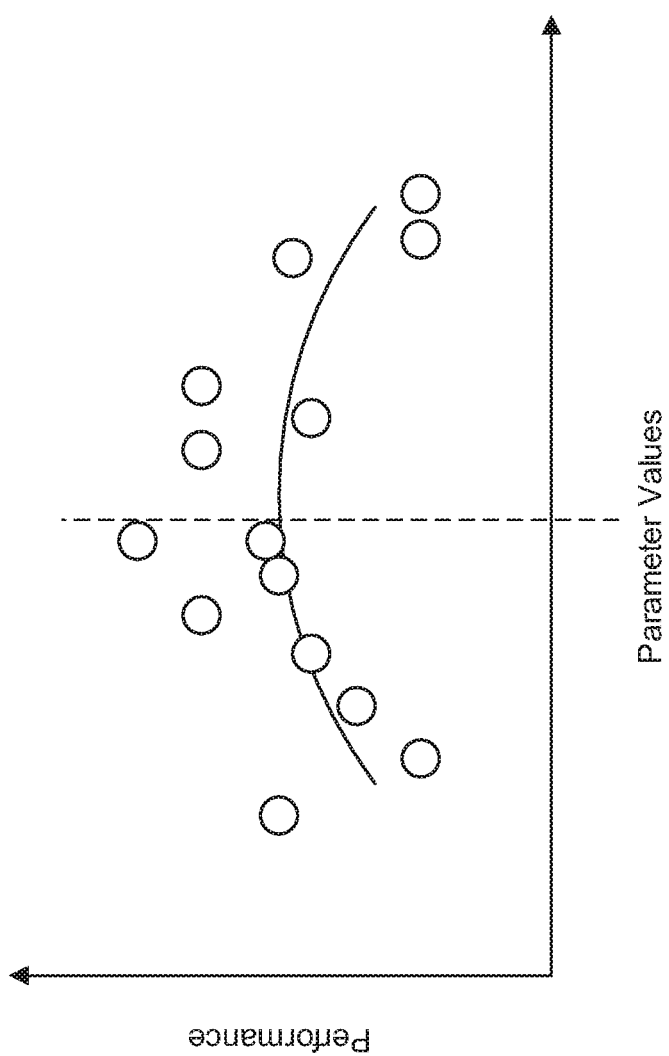
FIG. 9B illustrates a chart of the intelligent clustering in FIG. 9A.

In the example of FIG. 9B, cells (represented by circles) each have an associated parameter value that is plotted against performance in the network. As shown, cells with a lower performance include values that are very low or very high (represented by the circles at either end of the depicted curve), whereas cells with higher performance include values that appear in or approximately in the middle of the curve (represented by the circles near the vertical center line).

As an example, consider the case in which the task is to optimize UE average throughput/cell throughput performance by tuning or configuring the parameters, such as HO related configurations or power control parameters. To determine the relationship between performance in the network and the parameters, numerous observations (e.g., observations for different parameter values) are used to determine how the network performance is affected by the change in parameter value. This may be accomplished, for example, by reconfiguring cell(s)/time(s) exhibiting lower network performance with values of the parameters which are associated with better (optimized) performance as determined by machine learning (e.g., 510 in FIG. 5). That is, parameters with values that result in cells with a higher performance (optimized) may be used to configure (or re-configure) the parameters.

In one example, and for purposes of explanation, assume that KPI=y, such that there are N features that have been selected when analyzing the KPI, where x1, x2, . . . , x_N are the selected features. Additionally, for purposes of the example, assume these N features are collected based on one or more counters or calculations from counters in the network.

Counters include, but are not limited to, data samples collected from the network, such as the original data samples. The counters may be KPI observations of the network or the KPI itself, or calculated from counters. The N features may therefore, in one embodiment, dervie from the KPIs, or engineering parameters, etc. For example, if there are ten CQI levels (CQI levels 1, 2, . . . , 10), then a number of instances may be counted within a measurement duration or time period (e.g., one hour) for each of the CQI levels 1, . . . 10. In this case, each of the CQI levels may be the counters, such that there are 10 counters.

Continuing with the example, one of the KPIs formed may be the average CQI level, which can be calculated as (1*counter_CQI_1+2*counter_CQI_2+ . . . +10*counter_CQI_10)/(counter_CQI_1+counter_CQI_2+ . . . +counter_CQI_10). The average CQI can then be a calculated KPI or feature. However, it is appreciated that the features are not limited to KPIs. Some of the features could be from engineering parameters, or system parameters, such as the inter-site distance of the cells (cell radius), the height of the antennas, etc. It is also appreciated that any number of counters may be used.

In the above example, a parameter p is to be configured or tuned for optimization to maximize y, where y=f(x1, x2, . . . , x_N, p) and p is a variable. This may be expressed as:

$$\max\_p{:}y{=}f(x1,x2,\ldots,x\_N,p),$$

and rewritten as $$\max\_p{:}y{=}f_{-\{(x1,x2,\ldots,x\_N\}}(p).$$

Function $f_{-\{(x1, x2, \ldots, x\_N\}}(p)$ is a function of parameter p, where the features x1, x2, . . . , x_N are to be captured in the clustering. For purposes of this example, the features x1, x2, . . . , x_N of the function are assumed to be conditions that do not require further tuning or configuring. Thus, y may be optimized by tuning the parameter p, within each cluster, without adjusting the features x1, x2, . . . , x_N.

In one embodiment, in the event that the counters (features) x1, x2, . . . , x_N in the clustering do not have enough information to capture the function of y additional clustering may be performed. An example where the clustering does not provide enough information may include the selected features being a subset of factors which may impact y, where the subset of factors may not represent all factors impacting y. For example, a database of clustering information may not have the most current or updated information, and thus the counters may not be used as the feature for y, even though the features may have an impact on y.

In some embodiments, not all of the observations of x1, x2, . . . , x_N may be used. For example, some of the observations from x1, x2, . . . , x_N may no longer be relevant or have since become outdated. Moreover, in other embodiments, there may be other factors related to the outcome of y or directly impacting the outcome of y that have not been captured by the observations from x1, x2, . . . , x_N. Thus, under these circumstances, the optimization problem may be re-written as: $\max\_p{:}$ $y{=}f_{-\{(x1, x2, \ldots, x\_N, others\}}(p).$ The features x1, x2, . . . , x_N, and any other factors related to or directly impacting the outcome of y, may be additionally captured using the clustering operation. Other factors may include, but are not limited to, engineering parameters, external/environmental variables and the like.

If it is determined that parameter p has a weak or virtually no relationship with the features x_i=1, 2, . . . , N, then the features are considered to be independent or nearly independent of the parameters.

If the parameter p is related to some of the features x_i=1, 2, . . . , N, then the features are considered to not be independent or nearly independent of the parameters. For example, assume parameter p is related to feature x1, and that x1 is related to features other than parameter p. This may be denoted by: x1 is related to x_j (where 1<j≤N). For example, x1 is related to some of the counters which are used in (directly used, or used in calculation of) x2, x3, . . . , x_N.

If x_j cannot not be found (i.e., x_j, 1<j≤N cannot be found), where x_j is closely related to x_1, then x_{N+1} may be used as the feature. In this case, x_{N+1} is a counter or a KPI not yet selected in determining y, and x_{N+1} is not closely related parameter p, i.e., the change of x {N+1} does not result in any significant change in connection with a change of parameter p. Accordingly, x_1 can be removed from the feature, and x_2, x_3, . . . , _x_{N+1} can become the features. A new model for y may be expressed as:

$$\max\_p{:}y{=}h_{-\{(x2,\ldots,x\_N,x\_\{N+1\},others\}}(p),$$

where function $h_{-\{(x2, \ldots, x\_N, x\_\{N+1\}, others\}}(p)$ is a function of parameter p, where the features x2, . . . , x_N, x_{N+1} (and other features) are to be captured in the clustering.

If x_j can be found to be related to x_1, and x1 is related to x_{N+1}, then no significant change in connection with a change in parameter p results. In this case, assume for purposes of discussion that x1=g(x_j, x_{N+1}, p). In one embodiment, x1 may be found (i.e., find the function of g), and the function g may be used to replace x1 in the original problem of max_p: $y{=}f_{-\{(x1, x2, \ldots, x\_N, others\}}(p).$ That is, max_p is rewritten as: max_p: $y{=}$ $f_{-\{(g(x\_j, x\_\{N+1\}, p), x2, \ldots, x\_N, others\}}(p).$ Thus, the predicted x1 may be used as the feature in the current clustering, taking into account of the next adjustment or tuning of parameter p. This can be extended to the case if one or multiple x's in the set (x2, x3, . . . , x_N, x_{N+1}) can be found to be related to x_1, not just a single x_j. Then, the set of x's which are related to x_1, together with parameter p, can be used to predict the value of x_1, where such prediction can be captured by function g.

It is appreciated that the intelligent clustering methodology may be employed in any of the machine learning processes disclosed in FIGS. 5-8. This machine learning predicts the optimized value of the parameters for cells within each cluster. After the clustering for KQI or KPI has been completed, the prediction determines which parameter value is the best for cells having KQI or KPI measurements that underperform (lower performance) in cells within the cluster. This is distinct from the prediction via machine learning used to set up the model for KQI or KPI via clustering.

Figure 10:
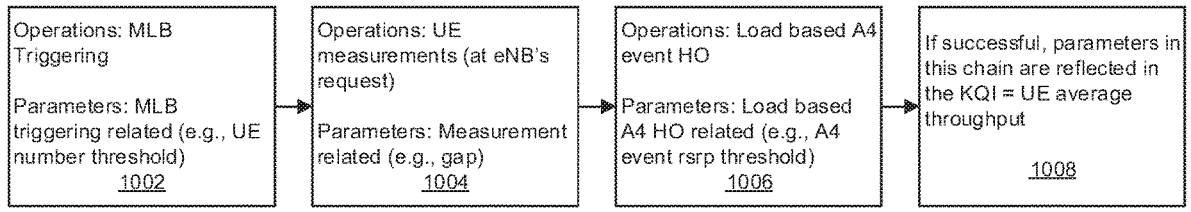
FIG. 10 shows an example of mobile load balancing related operations.

FIG. 10 shows an example of mobile load balancing related operations. The MLB operations includes, for example, triggering operations, execution operations and parameters related to the operations. The example illustrates how to determine which data samples (or subsets of the data samples) to use in learning and recommending parameter values for parameter configuration such that KQI and/or KPI performance may be optimized.

At 1002, a cell (e.g., cells 101-107 in FIG. 1B) is triggered when certain conditions are satisfied, such as when a number of uplink synchronized UEs in the cell is larger than a specified (e.g., triggering) threshold, where the threshold is related to MLB triggering parameters.

After the MLB is triggered, the serving cell (eNB) can request that UEs perform measurements at 1004. For example, candidate neighboring cells may need to satisfy various conditions, such as the load in the neighboring cell being lower (or lower than a specified amount) than the load in the serving cell. In the example where the MLB is inter-frequency related, when the UE performs inter-frequency measurements (e.g., measuring the neighboring cells at different radio frequencies from the serving cell of the UE), the UE may not be scheduled to receive data from the serving cell (or the serving cell does not schedule to transmit data to the UE as the UE). However, parameters related to the UE measurements may exist. For example, the measurement gap (which is related to a time window in which the UE may perform measurements) is a parameter that details when the UE is not scheduled for data.

Once the UEs report the measurements, the serving cell may handover UEs to neighboring cell(s) at 1006. For example, the HO may be a load based A4 event HO, where the related parameters to the load based A4 event HO can include, but are not limited to, the A4 event reference signal received power (RSRP, rsrp) threshold, neighboring cell's offsets, etc. If a UE reported neighboring cell's signal strength plus certain offsets is higher than the A4 event rsrp threshold, the UE can be handed over to the neighboring cell from the serving cell.

If the operations are successful, i.e., the MLB is triggered and MLB based HO is successfully executed, the parameters in the operations result in an outcome to the KQI and/or KPI measurements, as depicted at 1008.

FIGS. 11A-11D are example use case scenarios of the operations and parameters in FIG. 10. It is appreciated that the examples are non-limiting and that the specific operations and parameters disclosed are for purposes of discussion and not limitation.

Figure 11A:
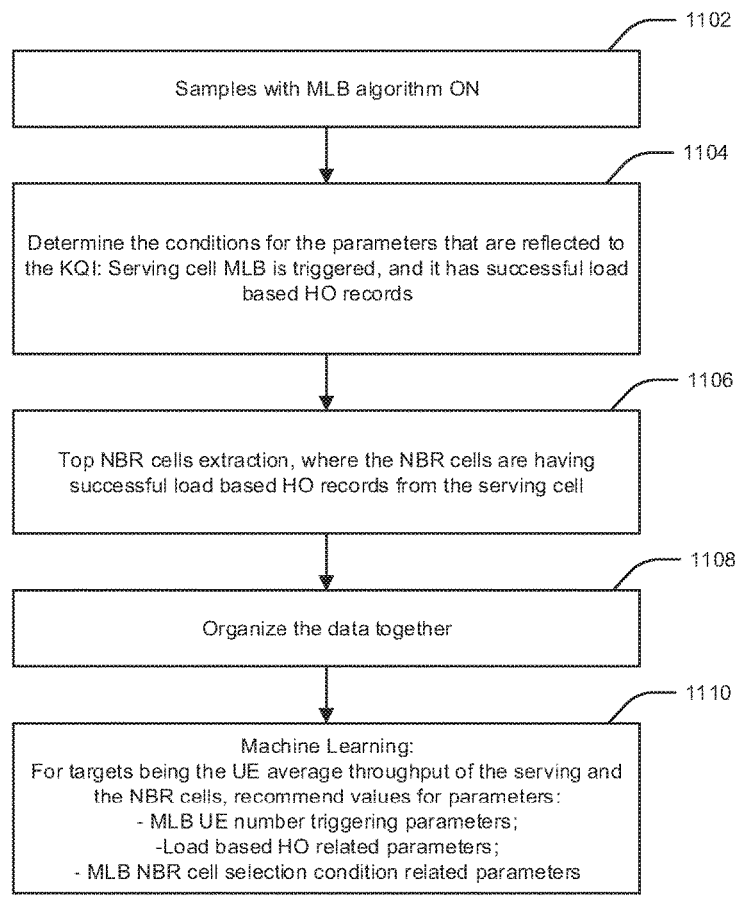
FIGS. 11A-11D are example use case scenarios of the operations and parameters in FIG. 10.

In FIG. 11A, data samples are collected from the cells, such as cells 101-107 of FIG. 1B, for which an MLB algorithm is active at 1102. That is, in the example, data samples are collected from cells in which the MLB algorithm is being employed.

At 1104, conditions under which the parameters change the results of the KQI or KPI measurements, as described above, are determined. For example, when the serving cell MLB is triggered, and the load based HO records have been successfully balanced, the conditions may be used to select the data samples collected in 1102.

For the serving cells satisfying the conditions (i.e., MLB has been triggered and the load based HO records have been successfully balanced), top neighboring (NBR) cells are extracted at 1106. For example, the top NBR cells extracted may be cells in which the serving cell has a relatively higher number (e.g., top 3 highest numbers) of successful load based HO according to the HO records.

The data samples can then be organized at 1108, including serving cells and respective NBR cells, with each serving cell having one or more top NBR cells, data samples for the serving cells and the NBR cells. The data samples can include, but are not limited to, the samples for the measured KQI and/or KPI, the parameter configurations, etc. The data samples include those satisfying the conditions in 1106.

At 1110, machine learning is applied using the data samples organized at 1108. In the example, the KQI and/or KPI, such as a KQI for the UE average throughput of the serving and NBR cells, are measured to determine optimal network performance. Results of the machine learning recommend values or configurations for parameters related to the operations which, in this example, lead to successful MLB load based HO. Parameters associated with the example may include MLB UE number triggering related parameters, load based HO related parameters, MLB NBR cell selection condition related parameters (where the MLB NBR cell selection can lead to candidate NBR cells which may have a load (e.g., indicated by the number of uplink synchronized UEs) lower than the serving cell's load; and the UE may perform measurement on the candidate NBR cells), etc.

Figure 11B:
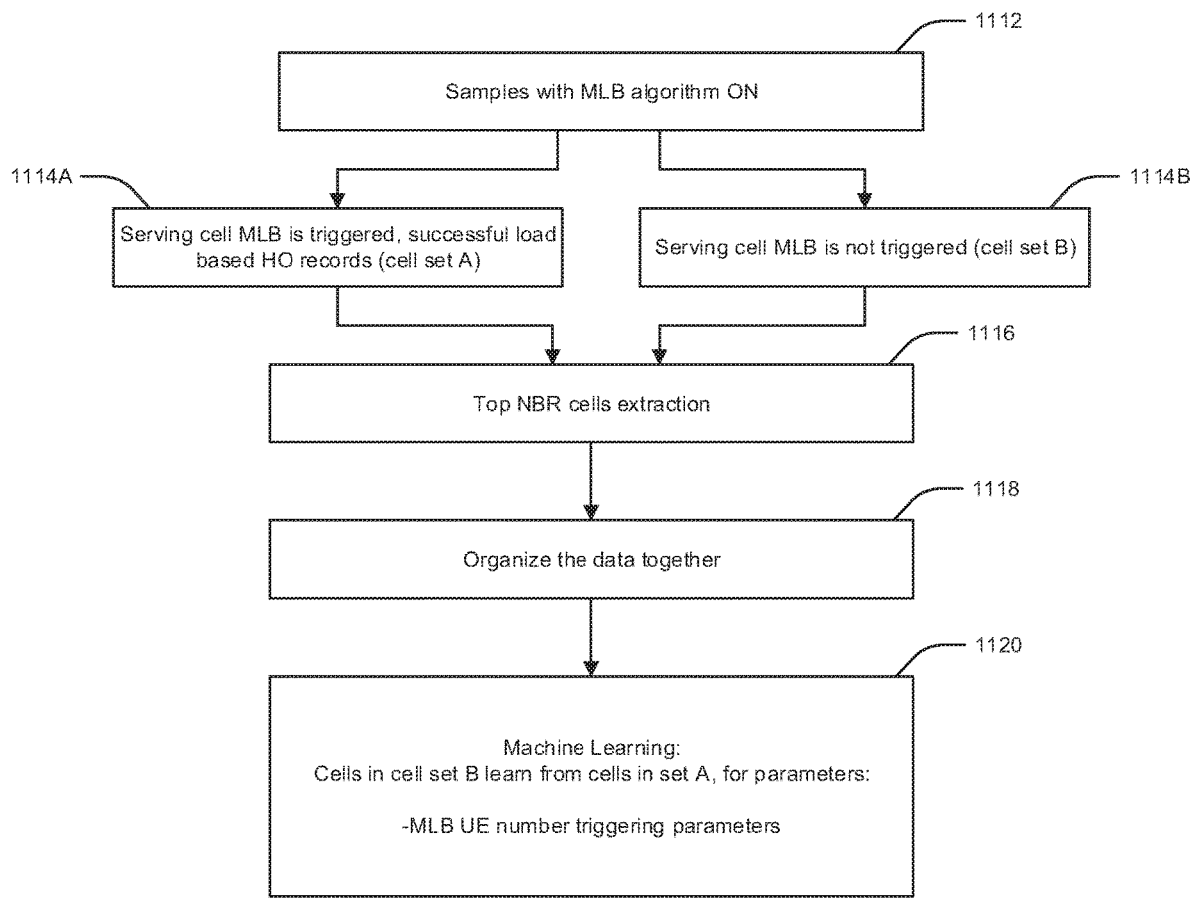

Turning to FIG. 11B, data samples are collected from the cells, such as cells 101-107 of FIG. 1B, for which the MLB algorithm is active at 1112. That is, in the example, data samples are collected from cells in which the MLB algorithm is being employed.

Serving cells satisfying conditions that the MLB has been triggered and for which has successful load based HO records (i.e., execution of the load based HO has been successfully executed) form cell set A at 1114A. Serving cells failing to satisfy one of the conditions (e.g., where the MLB is not triggered) form a cell set B at 1114B.

For each of the serving cells in set A or B, the top NBR cells are extracted at 1116. The top NBR cell extraction may include the same or different conditions for cell set A and cell set B. For example, for cell set A, the top NBR cells may be one or more cells for which there are high number of successful load based HOs from the serving cell, whereas for cell set B, the top NBR cells may be one or more cells for which there are a high number of the successful HOs that are coverage based (as opposed to load based).

At 1118, the cells are organized for the serving cells and the respective NBR cells, similar to the description of 1108 above.

Machine learning is applied at 1120, where cells in cell set B learn from cells in set A in order to determine the optimal configurations for parameters, such as the MLB UE number triggering related parameters. As explained above, the optimal configurations for the parameters are associated with KQI and/or KPI measurements in which network performance is improved (i.e., the KQI and/or KPI show better performance when configured with these parameters).

Figure 11C:
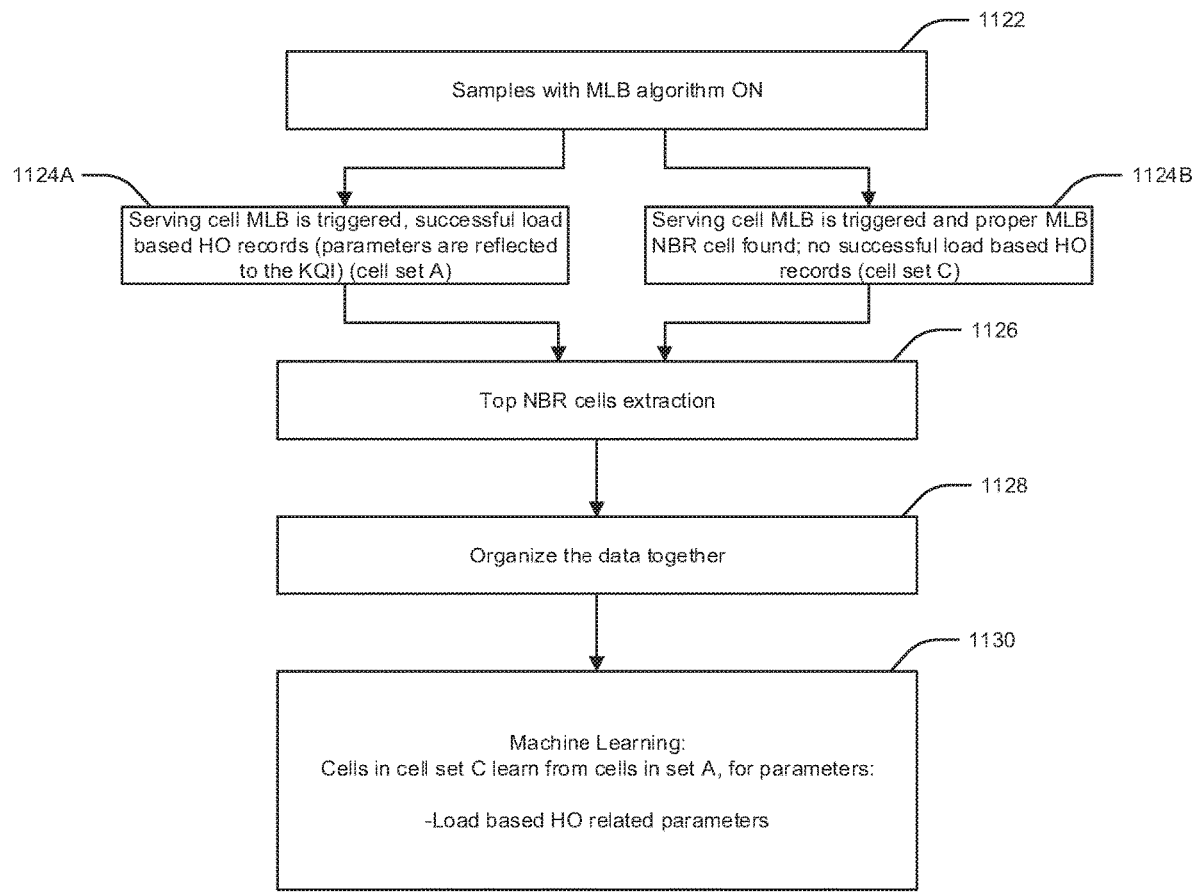

In the example of FIG. 11C, data samples are collected from the cells, such as cells 101-107 of FIG. 1B, for which the MLB algorithm is active at 1122. That is, in the example, data samples are collected from cells in which the MLB algorithm is being employed.

Serving cells satisfying conditions that the MLB has been triggered and for which has successful load based HO records (i.e., execution of the load based HO has been successfully executed) form cell set A at 1124A. The serving cells where the MLB is triggered and have a proper MLB NBR cell found (i.e., an eligible NBR cell which is suitable to be a target cell for the MLB load based handover), but without successful load based HO records, form cell set C at 1124B.

For each of the serving cells in cell set A or cell set C, top NBR cells are extracted 1126. The top NBR cell extraction may include the same or different conditions for cell set A and cell set C. For example, for cell set A, the top NBR cells may be one or more cells for which there are high number of successful load based HOs from the serving cell, whereas for cell set C, the top NBR cells may be one or more cells for which there are a high number of attempts of the load based HOs (but not successful execution of the HOs).

At 1128, the cells are organized for the serving cells and the respective NBR cells, similar to the description of 1108 above.

Machine learning is applied at 1130, where cells in cell set C learn from cells in set A in order to determine the optimal configurations for parameters, such as load based HO related parameters. Cell set C, which satisfies the MLB triggering, learns from cell set A since cell set C does not have successful load based HO records, indicating that the configurations for the HO related parameters may not be configured properly. As explained above, the optimal configurations for the parameters are associated with KQI and/or KPI measurements in which network performance is improved (i.e., the KQI and/or KPI show better performance when configured with these parameters).

Figure 11D:
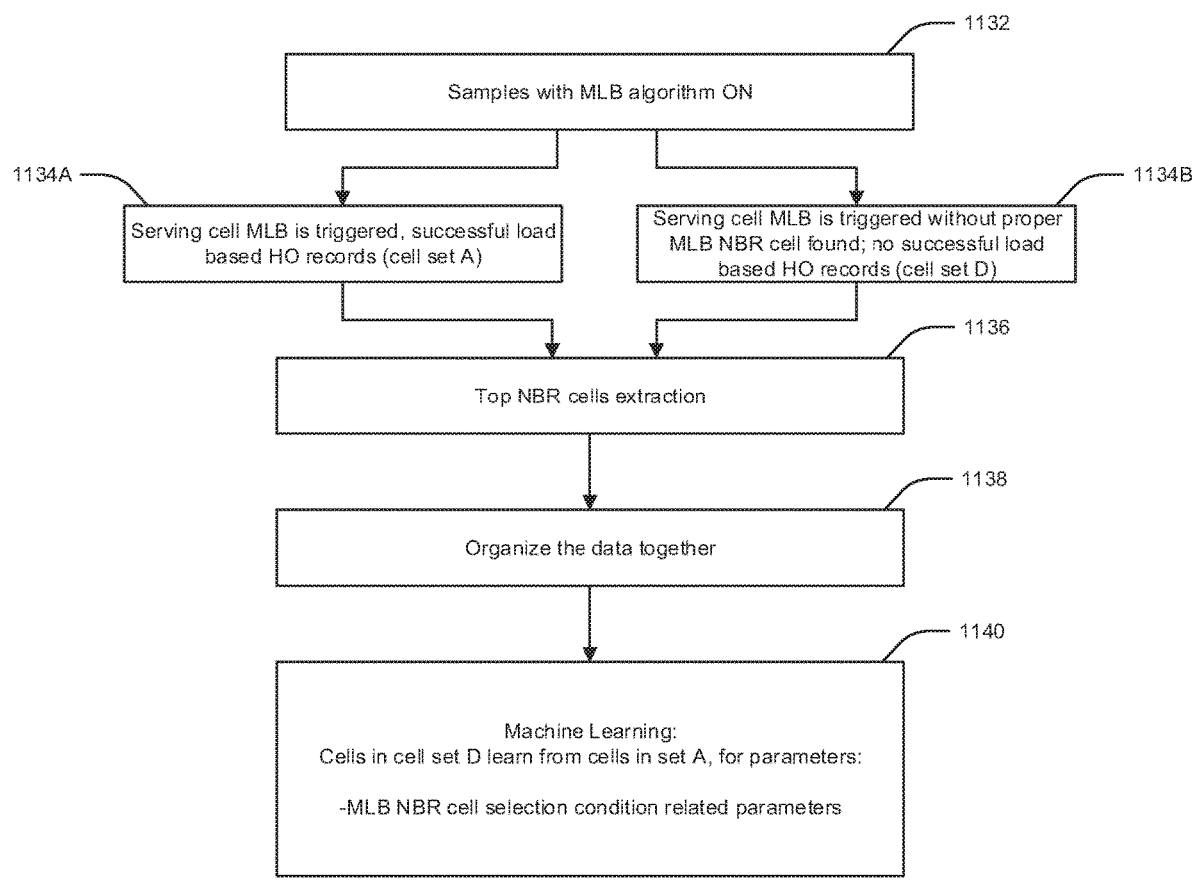

In the example of FIG. 11D, data samples are collected from the cells, such as cells 101-107 of FIG. 1B, for which the MLB algorithm is active at 1132. That is, in the example, data samples are collected from cells in which the MLB algorithm is being employed.

Serving cells satisfying conditions that the MLB has been triggered and for which has successful load based HO records (i.e., execution of the load based HO has been successfully executed) form cell set A at 1134A. The serving cells where the MLB is triggered, without a proper MLB NBR cell found, and without successful load based HO records, form cell set D at 1134B.

For each of the serving cells in cell set A or cell set D, top NBR cells are extracted 1136. The top NBR cell extraction may include the same or different conditions for cell set A and cell set D. For example, for cell set A, the top NBR cells may be one or more cells for which there are high number of successful load based HOs from the serving cell, whereas for cell set D, the top NBR cells may be one or more cells for which there are a high number of attempts of the load based HOs or successful HO of the non-load based HOs (e.g., the coverage based HO).

At 1138, the cells are organized for the serving cells and the respective NBR cells, similar to the description of 1108 above.

Machine learning is applied at 1140, where cells in cell set D learn from cells in set A in order to determine the optimal configurations for parameters, such as MLB NBR cells selection or candidate MLB NBR cells condition related parameters. Cell set D, which satisfies the MLB triggering, learns from cell set A since cell set D has not properly configured parameters for MLB NBR cells. As explained above, the optimal configurations for the parameters are associated with KQI and/or KPI measurements in which network performance is improved (i.e., the KQI and/or KPI show better performance when configured with these parameters).

FIG. 12A is a table illustrating gains obtained by application of the optimized parameter configurations to cells in a network. As illustrated, the gains are measured for each of the UE average throughput, UE average throughput at busy hours and the load balancing level. The resulting gains are an indication of the network optimization after applying the parameters determined to be optimal for configuration for a large number of cells. In particular, the gains are obtained by comparing the KQI(s) and/or KPI(s) measurements after configuring the parameters with the optimized parameters to the KQI(s) and/or KPI(s) obtained before applying the optimized parameters.

FIGS. 12B and 12C are tables illustrating gains obtained by application of the optimized parameter configurations to cells in a network when using intelligent clustering. In the example of FIG. 12B, the gains are measured for each of the UE average throughput and UE average throughput at busy hours during load based HO. The resulting gains are an indication of the network optimization after applying the parameters determined to be optimal for configuration for a large number of cells. In particular, the gains are obtained by comparing the KQI(s) and/or KPI(s) measurements after configuring the parameters with the optimized parameters to the KQI(s) and/or KPI(s) obtained before applying the optimized parameters.

In the example of FIG. 12C, the gains are measured for each of the UE average throughput and cell average throughput during coverage based HO. The resulting gains are an indication of the network optimization after applying the parameters determined to be optimal for configuration for a large number of cells. In particular, the gains are obtained by comparing the KQI(s) and/or KPI(s) measurements after configuring the parameters with the optimized parameters to the KQI(s) and/or KPI(s) obtained before applying the optimized parameters.

Figure 13:
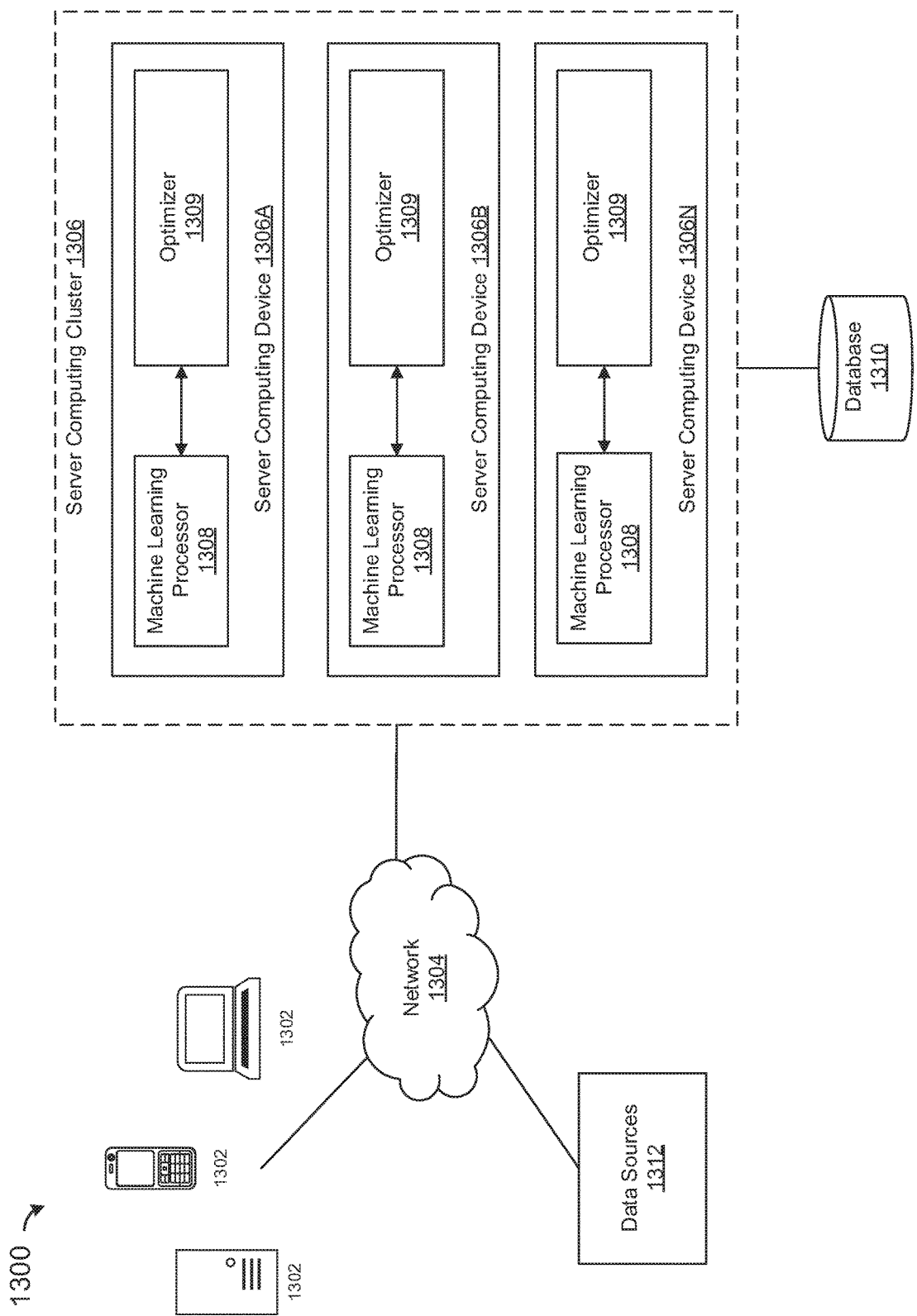
FIG. 13 is a block diagram of a system 1300 used in a computing environment for generating optimized parameters using a machine learning processor.

FIG. 13 is a block diagram of a system 1300 used in a computing environment for generating optimized parameters using a machine learning processor (e.g., processor 1308). The system 1300 includes a client computing devices 1302, a communications network 1304, server computing devices 1306A-1306N arranged in a server computing cluster 1306. Each server computing device 1306A-1306N has one or more machine learning processors 1308 that execute optimization processes. The system 1300 may also include database 1310 and one or more data sources 1312.

The client computing devices 1302 connect to the communications network 1304 in order to communicate with the server computing cluster 1306 to provide input and receive output relating to the process of generating optimized parameters using a machine learning processor. Example client computing devices 1302 include, but are not limited, to desktop computers, laptop computers, tablets, mobile devices, smartphones, and internet appliances. It should be appreciated that other types of computing devices that are capable of connecting to the components of the system 1300 can be used as appreciated by the skilled artisan.

The communication network 1304 enables each of the other components of the system 1300 to communicate with each other in order to perform the process of generating optimized parameters using a machine learning processor. The network 1304 may be, for example, a local network, such as a LAN, or a wide area network, such as the Internet and/or a cellular network. In some embodiments, the network 1304 is comprised of several discrete networks and/or sub-networks (e.g., cellular to Internet) that enable the components of the system 1300 to communicate with each other.

The server computing devices 1306A-1306N include one or more machine learning processors 1308 and physical memory (not shown)—including the optimizer 1309 that executes on the machine learning processor 1308 of the associated server computing device 1306A-1306N, to receive data from other components of the system 1300, transmit data to other components of the system 1300, and perform functions for generating optimized parameters using a machine learning processor.

The machine learning processors 1308 and the corresponding optimizer 1309 provide the beneficial technical improvement of enabling the system 1300 to automatically process and analyze large sets of complex computer data samples using a plurality of computer-generated machine learning models to generate user-specific actionable output relating to the selection and optimization of parameters, such as cellular network configuration parameters, for network optimization. The machine learning processors 1308 execute artificial intelligence algorithms as contained within the optimizer 1309 to constantly improve the machine learning model by automatically assimilating newly-collected data samples into the model without relying on any manual intervention.

The machine learning processors 1308 is a processor embedded in the corresponding server computing device 1306 that is configured to retrieve data samples from the database 1310 and the data sources 1312 for the execution of the optimizer 1309. The database 1310 may include, for example, historical data collected from the data sources 1312 or otherwise input into the system 1300. Each machine learning processor 1308 is programmed with instructions to execute artificial intelligence algorithms that automatically process the input and traverse computer-generated models in order to generate output corresponding to the optimizer.

The machine learning processors 1308 execute a variety of algorithms and generates different data structures (including, in some embodiments, computer-generated models) to achieve the objectives described herein. In one example, in both model training and model operation phases, the first phase performed by each machine learning processor 1308 is data preparation that involves eliminating incomplete data elements or filling in missing values, constructing calculated variables as functions of data provided, formatting information collected to ensure consistency, data normalization or data scaling and other pre-processing tasks.

In the training phase, initial data processing may lead to a reduction of the complexity of the data set through a process of variable selection. The process is meant to identify non-redundant characteristics present in the data collected that will be used in the computer-generated analytical model. This process also helps determine which variables are meaningful in analysis and which can be ignored. It should be appreciated that by "pruning" the dataset in this manner, the system achieves significant computational efficiencies in reducing the amount of data needed to be processed and thereby effecting a corresponding reduction in computing cycles required.

In addition, in some embodiments the machine learning model includes a class of models that can be summarized as supervised learning or classification, where a training set of data is used to build a predictive model that will be used on "out of sample" or unseen data to predict the desired outcome. In one embodiment, the linear regression technique is used to predict the appropriate categorization of an asset and/or an allocation of assets based on input variables. In another embodiment, a decision tree model can be used to predict the appropriate classification of an asset and/or an allocation of assets. Clustering or cluster analysis is another technique that may be employed, which classifies data into groups based on similarity with other members of the group. For example, the clustering technique described with reference to FIG. 6 may be employed.

Each machine learning processor 1308 can also employ non-parametric models. These models do not assume that there is a fixed and unchanging relationship between the inputs and outputs, but rather the computer-generated model automatically evolves as the data grows and more experience and feedback is applied. Certain pattern recognition models, such as the k-Nearest Neighbors algorithm, are examples of such models.

Furthermore, each machine learning processor 1308 develops, tests and validates the computer-generated model described herein iteratively according to the processes highlighted above. For example, each processor 1308 scores each model objective function and continuously selects the model with the best outcomes.

In some embodiments, the optimizer 1309 is a set of artificial intelligence-based software instructions programmed onto the associated machine learning processor 1308 in the server computing device 1306 and can include specifically-designated memory locations and/or registers for executing the computer software instructions.

The database 1310 is coupled to the server computing cluster 1306 and is configured to receive, generate, and store specific segments of data relating to the process of generating optimized parameters using a machine learning processor 1308. In some embodiments, all or a portion of the database 1310 can be integrated with the server computing device 1306 or be located on a separate computing device or devices.

The data sources 1312 comprise a variety of databases, data feeds, sensors and other sources that supply data to each machine learning processor 1308 to be used in generating optimized parameters using a machine learning processor 1308. The data sources 1312 can provide data to the server computing devices 1306N according to any of a number of different schedules (e.g., real-time, daily, weekly, monthly, etc.) or based on events that trigger various operations.

Further to the above elements of system 1300, it should be appreciated that the machine learning processors 1308 can build and train the computer-generated model prior to conducting the processing described herein. For example, each machine learning processor 1308 can retrieve relevant data elements from the database 1310 and/or the data sources 1312 to execute algorithms necessary to build and train the computer-generated model (e.g., input data, target attributes) and execute the corresponding artificial intelligence algorithms against the input data set to find patterns in the input data that map to the target attributes. Once the applicable computer-generated model is built and trained, the machine learning processors 1308 can automatically feed new input data (e.g., an input data set) for which the target attributes are unknown into the model using, e.g., the optimizer 1309. Each machine learning processor 1308 then executes the corresponding optimizer 1309 to generate predictions about how the data may be used to optimize parameters.

Figure 14:
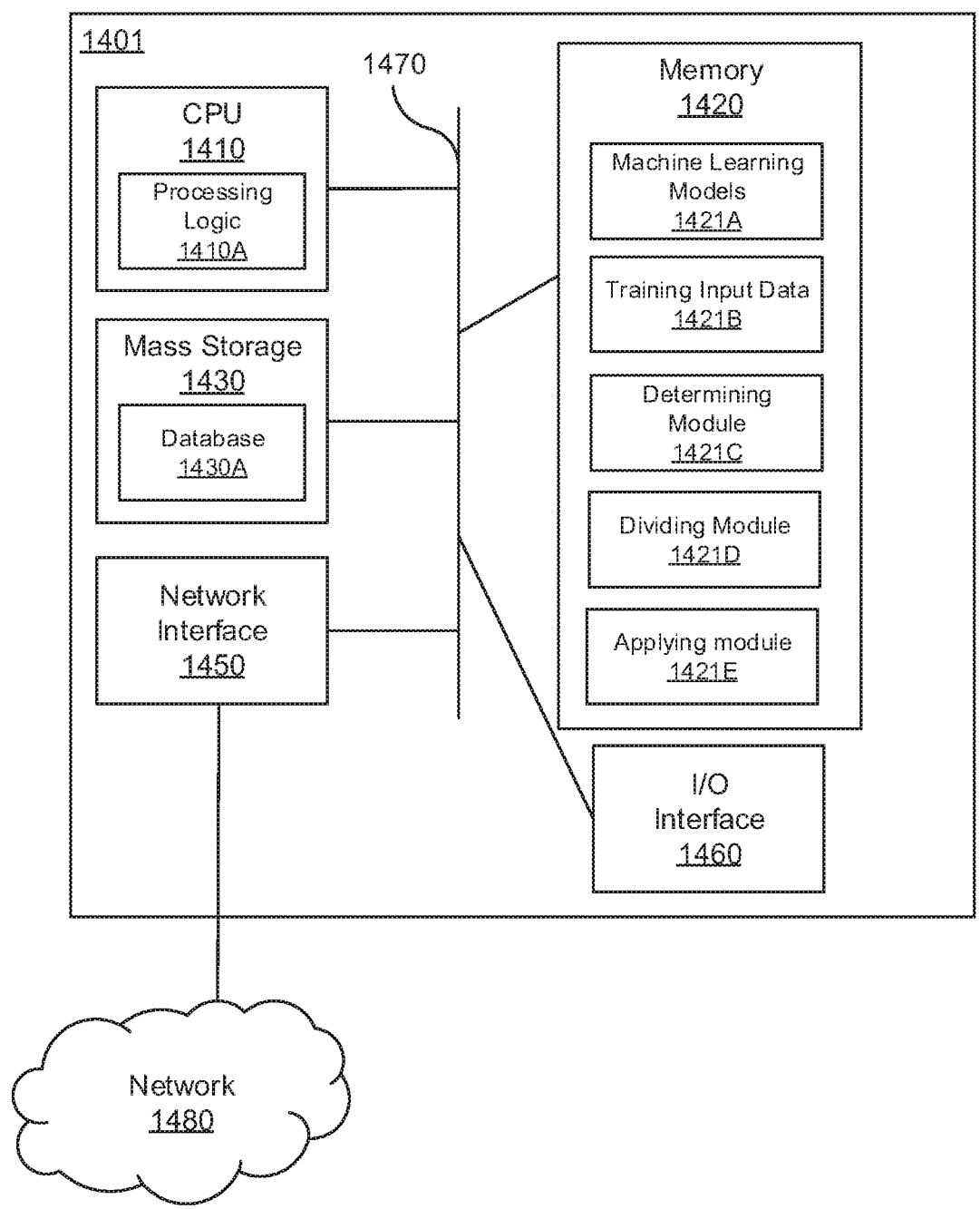
FIG. 14 is a block diagram of a network device that can be used to implement various embodiments.

FIG. 14 is a block diagram of a network device that can be used to implement various embodiments. Specific network devices may utilize all of the components shown, or only a subset of the components, and levels of integration may vary from device to device. Furthermore, the network device 1400 may contain multiple instances of a component, such as multiple processing units, processors, memories, transmitters, receivers, etc. The network device 1400 may comprise a processing unit 1401 equipped with one or more input/output devices, such as network interfaces, storage interfaces, and the like. The processing unit 1401 may include a central processing unit (CPU) 1410, a memory 1420, a mass storage device 1430, and an input/output (I/O) interface 660 connected to a bus 1470. The bus 1470 may be one or more of any type of several bus architectures including a memory bus or memory controller, a peripheral bus or the like.

The CPU 1410 may comprise any type of electronic data processor. The memory 1420 may comprise any type of system memory such as static random access memory (SRAM), dynamic random access memory (DRAM), synchronous DRAM (SDRAM), read-only memory (ROM), a combination thereof, or the like. In one embodiment, the CPU 1410 includes processing logic 1410A which may perform operations and functionality discussed herein.

In an embodiment, the memory 1420 may include ROM for use at boot-up, and DRAM for program and data storage for use while executing programs. In embodiments, the memory 1420 is non-transitory. In one embodiment, the memory 1420 includes machine learning models 1421A and training input data 1421B used to train the models via machine learning or statistical methods and training a prediction model based on the training data using machine learning or statistical methods. The memory 1420 further includes a determining module 1421C to determine whether parameter configurations result in a change to at least one of KQI and KPI measurements based on data samples collected in the wireless communications network and determining which of the subsets of the data samples to use machine learning for optimizing the configurations for the parameters, a dividing module 1421D to divide the data samples into subsets, and an applying module 1421E to apply machine learning using the determined subsets of the data samples to determine the configurations for the parameters to optimize the wireless communications network.

The mass storage device 1430 may comprise any type of storage device configured to store data, programs, and other information and to make the data, programs, and other information accessible via the bus 1470. The mass storage device 1430 may comprise, for example, one or more of a solid state drive, hard disk drive, a magnetic disk drive, an optical disk drive, a dataset 1430A or the like.

The processing unit 1401 also includes one or more network interfaces 1450, which may comprise wired links, such as an Ethernet cable or the like, and/or wireless links to access nodes or one or more networks 1480. The network interface 1450 allows the processing unit 1401 to communicate with remote units via the networks 1480. For example, the network interface 1450 may provide wireless communication via one or more transmitters/transmit antennas and one or more receivers/receive antennas. In an embodiment, the processing unit 1401 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

In accordance with various embodiments of the present disclosure, the methods described herein may be implemented using a hardware computer system that executes software programs. Further, in a non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for configuring parameters in a wireless communications network having one or more cells, the method comprising:

determining whether parameter configurations result in a change to at least one of key quality indicator (KQI) or key performance indicator (KPI) measurements based on data samples collected in the wireless communications network;

dividing the data samples into subsets including
a first subset of the data samples including the data samples associated with the parameter configurations failing to result in the change to the at least one of the KQI or KPI measurements, and
a second subset of the data samples including the data samples associated with the parameter configurations resulting in the change to at least one of the KQI or KPI measurements dependent upon a triggering threshold for an operation being satisfied and the operation satisfying the triggering threshold being successfully executed in the wireless communications network;

determining which of the subsets of the data samples to use for optimizing the parameter configurations; and providing the determined subsets of the data samples as an input to machine learning to learn the parameter configurations that yield the at least one of the KQI or KPI measurements to optimize performance in the wireless communications network, the providing comprising selecting features for clustering the one or more cells in the wireless communications network as a predictor of performance such that the selected features result in a change to the at least one of the KQI or KPI measurements;

identifying the features that are independent of the parameter configurations to be optimized;

clustering the one or more cells for a time period using the identified features; and selecting, within a cluster of the one or more cells, values for the parameter configurations that optimize the performance in the wireless communications network.

2. The method of claim 1, wherein the determination of whether the parameter configurations result in a change to at least one of the KQI or KPI measurements is based on satisfying one or more conditions in the wireless communications network.

3. The method of claim 2, wherein the one or more conditions include at least of a triggering threshold, an operation being triggered and the operation being successfully executed.

4. The method of claim 1, further comprising:

separating the parameter configurations into categories including a first category corresponding to the data samples for which the parameter configurations always result in the change to at least one of the KQI or KPI measurements, and a second category corresponding to the first and second subsets of the data samples; and providing the first category of parameter configurations as an input to machine learn the parameter configurations to optimize the wireless communications network.

5. The method of claim 1, wherein the parameter configurations include at least one of a single parameter, a composite parameter including multiple parameters, a function of one or multiple parameters, and an expression of one or multiple parameters.

6. The method of claim 1, wherein the first and second subsets of the data samples learn from each other.

7. The method of claim 1, wherein selecting the values comprises:

comparing the wireless communications network performance for each of the values of parameter configurations, and choosing the value associated with the parameter configuration that results in the optimized wireless communications network performance; and further comprising:

reconfiguring the one or more cells in the cluster in which the wireless communication network results in less than optimal network performance using the chosen value.

8. The method of claim 1, wherein identifying the features as independent of the parameter configurations to be optimized is determined by at least one of the effect of changing the parameter configurations of the feature, a degree of impact of the feature changing when the parameter configurations are tuned, or a correlation of the parameter configurations and the feature.

9. A device for configuring parameters in a wireless communications network having one or more cells, comprising:

a non-transitory memory storage comprising instructions; and one or more processors in communication with the memory, wherein the one or more processors execute the instructions to perform operations comprising:

determining whether parameter configurations result in a change to at least one of key quality indicator (KQI) or key performance indicator (KPI) measurements based on data samples collected in the wireless communications network;

dividing the data samples into subsets including a first subset of the data samples including the data samples associated with the parameter configurations failing to result in the change to the at least one of the KQI or KPI measurements, and a second subset of the data samples including the data samples associated with the parameter configurations resulting in the change to at least one of the KQI or KPI measurements dependent upon a triggering threshold for an operation being satisfied and the operation satisfying the triggering threshold being successfully executed in the wireless communications network;

determining which of the subsets of the data samples to use for optimizing the parameter configurations; and providing the determined subsets of the data samples as an input to machine learning to learn the parameter configurations that yield the at least one of the KQI or KPI measurements to optimize performance in the wireless communications network, the providing comprising selecting features for clustering the one or more cells in the wireless communications network as a predictor of performance of the wireless communication network such that the selected features result in a change to the at least one of the KQI or KPI measurements;

identifying the features that are independent of the parameter configurations to be optimized;

clustering the one or more cells for a time period using the identified features; and selecting, within a cluster of the one or more cells, values for the parameter configurations that optimize the performance in the wireless communications network.

10. The device of claim 9, wherein the determination of whether the parameter configurations result in a change to at least one of the KQI or KPI measurements is based on satisfying one or more conditions in the wireless communications network.

11. The device of claim 10, wherein the one or more conditions include at least of a triggering threshold, an operation being triggered and the operation being successfully executed.

12. The device of claim 9, wherein the one or more processors further execute the instructions to perform operations comprising:

separating the parameter configurations into categories including a first category corresponding to the data samples for which the parameter configurations always result in the change to at least one of the KQI or KPI measurements, and a second category corresponding to the first and second subsets of the data samples; and providing the first category of parameter configurations as an input to machine learning for the parameter configurations to optimize the wireless communications network.

13. The device of claim 9, wherein the parameter configurations include at least one of a single parameter, a composite parameter including multiple parameters, a function of one or multiple parameters, or an expression of one or multiple parameters.

14. The device of claim 9, wherein the first and second subsets of the data samples learn from each other.

15. The device of claim 9,
wherein selecting the values comprises
comparing the wireless communications network performance for each of the values of parameter configurations, and
choosing the value associated with the parameter configuration that results in the optimized wireless communications network performance; and
the one or more processors execute the instructions to perform operations comprising:
reconfiguring the one or more cells in the cluster in which the wireless communication network results in less than optimal network performance using the chosen value.

16. The device of claim 9, wherein identifying the features as independent of the parameter configurations to be optimized is determined by at least one of the effect of changing the parameter configurations of the feature, a degree of impact of the feature changing when the parameter configurations are tuned, or a correlation of the parameter configurations and the feature.

17. A non-transitory computer-readable medium storing computer instructions for configuring parameters in a wireless communications network having one or more cells, that when executed by one or more processors, perform the steps of:
determining whether parameter configurations result in a change to at least one of key quality indicator (KQI) or key performance indicator (KPI) measurements based on data samples collected in the wireless communications network;
dividing the data samples into subsets including
a first subset of the data samples including the data samples associated with the parameter configurations failing to result in the change to the at least one of the KQI or KPI measurements, and
a second subset of the data samples including the data samples associated with the parameter configurations resulting in the change to at least one of the KQI or KPI measurements dependent upon a triggering threshold for an operation being satisfied and the operation satisfying the triggering threshold being successfully executed in the wireless communications network;
determining which of the subsets of the data samples to use for optimizing the parameter configurations; and
providing the determined subsets of the data samples as an input to machine learning to learn the parameter configurations that yield the at least one of the KQI or KPI measurements to optimize performance in the wireless communications network, the providing comprising
selecting features for clustering the one or more cells in the wireless communications network as a predictor of performance of the wireless communication network such that the selected features result in a change to the at least one of the KQI or KPI measurements;
identifying the features that are independent of the parameter configurations to be optimized;
clustering the one or more cells for a time period using the identified features; and
selecting, within a cluster of the one or more cells, values for the parameter configurations that optimize the performance in the wireless communications network.

18. The non-transitory computer-readable medium of claim 17, wherein the determination of whether the parameter configurations result in a change to at least one of the KQI or KPI measurements is based on satisfying one or more conditions in the wireless communications network.

19. The non-transitory computer-readable medium of claim 18, wherein the one or more conditions include at least of a triggering threshold, an operation being triggered and the operation being successfully executed.

20. The non-transitory computer-readable medium of claim 17, when further executed by one or more processors, perform the steps of:
separating the parameter configurations into categories including
a first category corresponding to the data samples for which the parameter configurations always result in the change to at least one of the KQI or KPI measurements, and
a second category corresponding to the first and second subsets of the data samples; and
providing the first category of parameter configurations as an input to machine learning for the parameter configurations to optimize the wireless communications network.

21. The non-transitory computer-readable medium of claim 17, wherein the parameter configurations include at least one of a single parameter, a composite parameter including multiple parameters, a function of one or multiple parameters, or an expression of one or multiple parameters.

22. The non-transitory computer-readable medium of claim 17, wherein the first and second subsets of the data samples learn from each other.

23. The non-transitory computer-readable medium of claim 17,
wherein selecting the values comprises:
comparing the wireless communications network performance for each of the values of parameter configurations, and
choosing the value associated with the parameter configuration that results in the optimized wireless communications network performance; and
when executed by one or more processors, perform the step of:
reconfiguring the one or more cells in the cluster in which the wireless communication network results in less than optimal network performance using the chosen value.

24. The non-transitory computer-readable medium of claim 17, wherein identifying the features as independent of the parameter configurations to be optimized is determined by at least one of the effect of changing the parameter configurations of the feature, a degree of impact of the feature changing when the parameter configurations are tuned, or a correlation of the parameter configurations and the feature.

* * * * *